Figure 1:
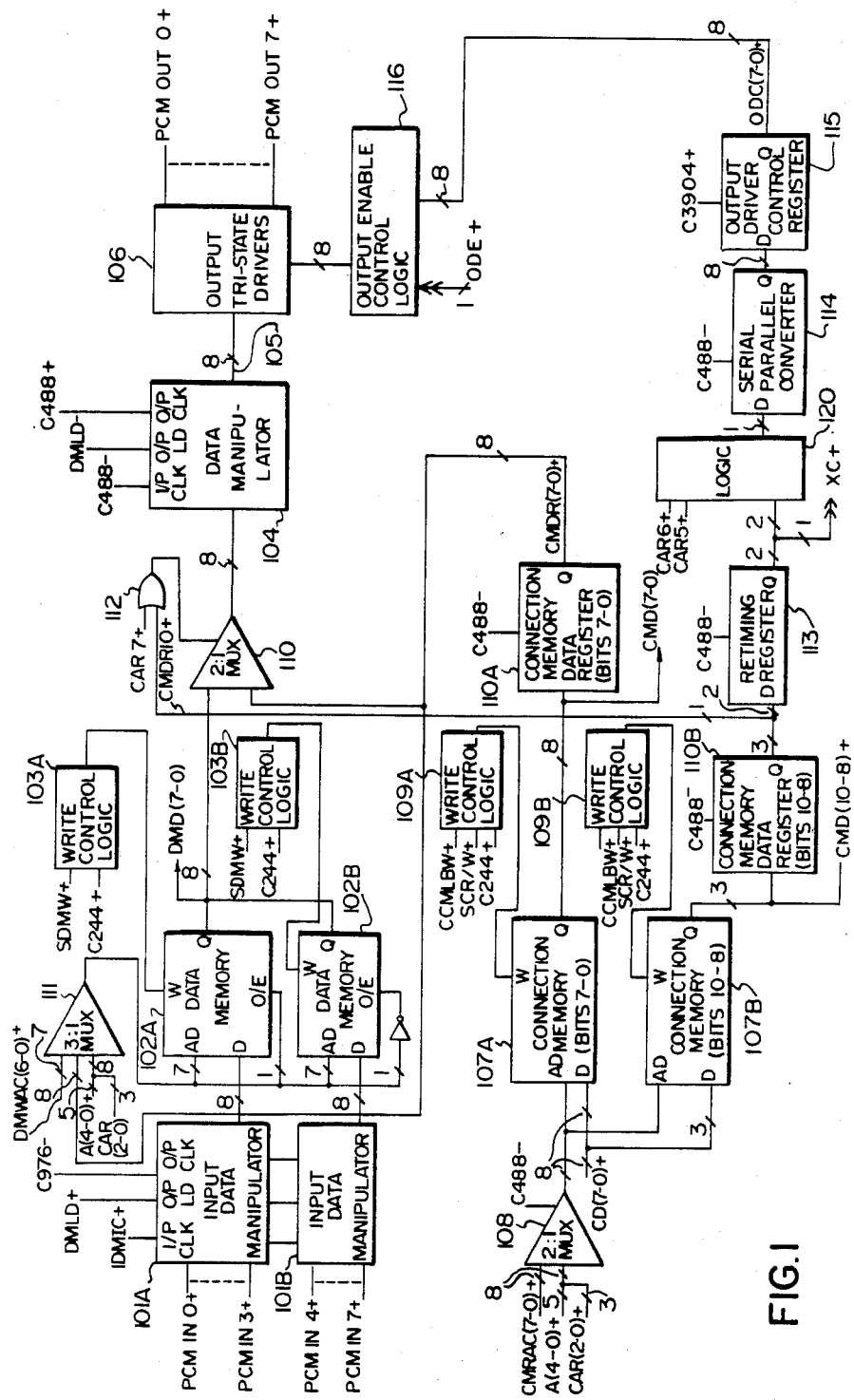

United States Patent [19]

Lewis

[11] Patent Number: 4,510,597

[45] Date of Patent: Apr. 9, 1985

[54] TIME DIVISION SWITCHING MATRIX

[75] Inventor: Conrad Lewis, Nepean, Canada

[73] Assignee: Mitel Corporation, Ontario, Canada

[21] Appl. No.: 327,196

[22] Filed: Dec. 3, 1981

[51] Int. Cl.³ .............................................. H04J 3/00
[52] U.S. Cl. ........................................ 370/66; 370/68
[58] Field of Search ................. 370/58, 66, 68, 110.1, 370/54

[56] References Cited

U.S. PATENT DOCUMENTS

| 4,093,827 | 6/1978 | Charransol et al. | 370/66 |
| 4,322,843 | 3/1982 | Beuscher et al. | 370/58 |
| 4,370,742 | 1/1983 | Minamitani et al. | 370/58 |
| 4,392,221 | 7/1983 | Hesketh | 370/58 |

Primary Examiner—Douglas W. Olms
Assistant Examiner—Frank M. Scutch, III

Attorney, Agent, or Firm—Antonelli, Terry & Wands

[57] ABSTRACT

A time division switching matrix which receives time division multiplexed signals on a plurality of input lines according to a first sequence and switches them to a plurality of output lines according to a second sequence, after storage in a data memory. A controller can read any of the signals stored in the data memory and can also substitute data signals on the output lines in place of the signals stored in the data memory. Accordingly the switching matrix controller can receive data signals destined for it on the same PCM lines which normally carry PCM input voice signals, and can transmit data or control signals on the same output PCM lines as would normally carry PCM output voice signals. Controller to controller communication on the PCM lines can thus be obtained throughout an extended network, without providing separate controller communication lines.

13 Claims, 20 Drawing Figures

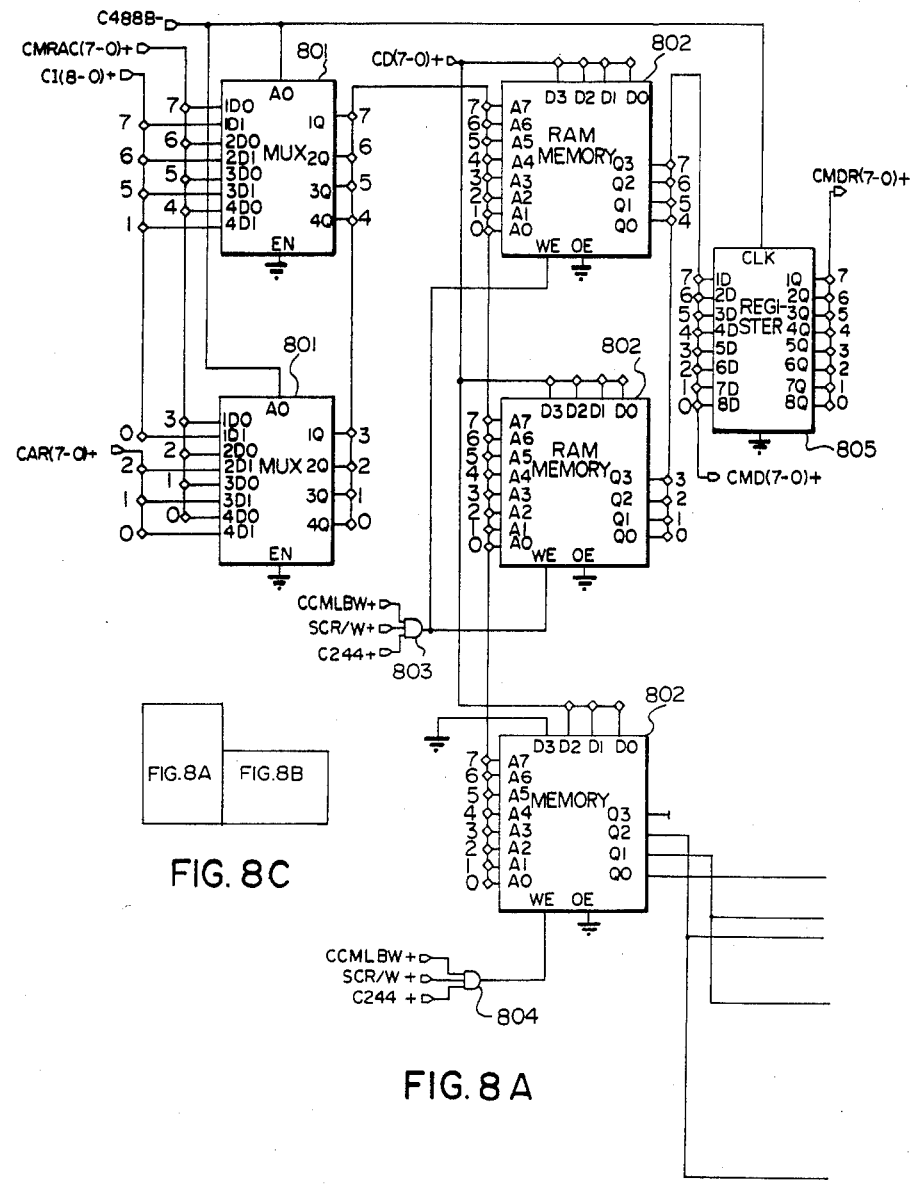

TIME DIVISION SWITCHING MATRIX

This invention relates to a time division switching matrix, particularly to one which switches PCM input signals carried by a group of input lines from any time intervals to the same or other time intervals in a group of output lines, and which also can substitute other signals on the output lines, facilitating controller to controller communication over the same lines as the PCM input signals.

A time division multiplex switching matrix typically has a plurality of input lines carrying frames of PCM words which are to be switched to a plurality of output lines. Typically the signal on each line is organized into a sequence of frames, each frame being divided into 32 time channels, each channel being formed of an 8 bit PCM word. A standardized frame rate is 8 kilohertz, resulting in 2.048 megabits per second being transmitted on each line. It is the function of a time division switching matrix to switch any of the 32 input channels on any input line to any output channel on any output line.

The above switching function is carried out in the invention described in U.S. Pat. No. 4,093,827, issued June 6, 1978, and assigned to Thomson-C.S.F., Paris, France. In that invention, the serial PCM signal on each of the input lines is parallelized and stored in a shift register. At one bit time shifts, the contents of each shift register are stored, in parallel form, in a speech memory. Each PCM word is recorded in the memory at a position corresponding to the input line from which it arrives, and by its order in the particular frame. Consequently the memory is organized in the form of 32 (frames) × 8 (lines) = 256 words of 8 bits each. The address of each of the words is also represented by an 8 bit word, the least significant three bits representing the input line and the 5 more significant bits representing the sequential frame order.

An address memory is also provided which stores the output address sequence, the addresses of the words to be read being stored therein in sequential locations representing the output sequence. These addresses are read sequentially and are applied to the read address inputs of the speech memory. This causes the stored PCM words to be output in parallel according to a new sequence to an output circuit which converts the parallel words to serial format and applies them to a plurality of output lines.

The aforenoted network is particularly suited to switching PCM encoded speech from a plurality of input lines to a plurality of output lines, with virtually zero blocking, and switching networks can be built up to switch a large number of input lines, each having, e.g. 32 serial PCM channels, to a large group of output lines of the same type. It is restricted, however, to switching PCM words received from the input lines, and to control a network of matrixes, auxilliary controller to controller buses must be used. This adds to the physical wiring as well as timing complexity, since the PCM words must be carefully timed throughout an entire network.

However, it is more desirable to switch data as well as voice over the same network. The above-described prior art system does not appear to be capable of handling both strings of data as well as PCM voice, over the same lines, particularly when the data is generated by or is intended for one or a plurality of particular matrix controllers itself. In such systems, it is required that the network should be able to carry control or data signals between controllers as well as PCM voice signals, or data generated by or to be routed via a controller to be applied to the PCM lines for 2-way communication with remote data terminals such as subscriber terminals, which themselves may be combination data and voice terminals. Clearly the signal timing problem in each in such an extended network would be extremely complex, and such network will be extremely difficult to enlarge in the field.

The present invention is a time division switching matrix which can handle both PCM voice and data, whereby the voice signals are received on a plurality of input time division multiplexed lines and are switched to similar kinds of output lines. However in contrast to the prior art, in the present invention the received signals can be read by the controller itself, e.g., used for control of the controller, and the controller can itself generate or pass control or data signals to the output lines. In this manner the controller can be, in effect, an interactive terminal which not only controls the switching within a particular time division switching matrix, but also communicates with other controllers and with subscriber data terminals which may be connected to external lines. Thus the controller can be used to access local or remote data bases or programs, can be used to facilitate computer to computer communications, etc., and in general can facilitate the connection of both voice circuits and data circuits and can interact with the data circuits for control or other purposes.

Indeed, it is a feature of the present invention that the controller is able to directly control peripheral apparatus, one class of which is a plurality of tri-state switches or drivers connected in series with each output line, which facilitates interconnection of the subject matrix in various forms of networks.

It should be noted the above is achieved in the present invention via the same input and output lines as would otherwise carry PCM voice signals. Therefore no special controller to controller buses are required for communication therebetween. This data which is input to a following matrix can be read by the controller thereof, or if destined for a controller of a subsequent matrix, by the subsequent matrix controller. Further, the timing of these data signals is such that no special circuitry is required to switch or send them other than that described herein. A network made up of these matrixes can thus be expanded or changed without extraordinary regard to timing of the signals through the network.

In general, the invention is a time division switching matrix comprising a circuit for receiving first sequences of signals divided into series time slots on a plurality of input lines, switching apparatus for switching the signals to a plurality of output lines according to a second sequence, a receiving circuit for receiving control signals, a circuit for controlling the switching apparatus to establish the second sequence upon receipt of the control signals of a first form, and for controlling the switching apparatus upon receipt of a second form of the control signals to output a third form of the control signals to the plurality of output lines.

More particularly, the invention is a time division switching matrix comprising a serial to parallel converter for receiving time division multiplexed signals from a plurality of input lines and for converting the signals into sequences in parallel form, and a data memory for receiving the parallel form signals and for storing them according to a predetermined plan. Circuitry is provided for receiving control signals from a plurality of control lines, the control signals being comprised of address and data bits. A connection memory stores the data bits at locations specified by the address bits. The connection memory is sequentially read to output a data word formed of a plurality of parallel bits. A multiplexer has a pair of input buses connected thereto, one input bus connected to receive output signals from the data memory and the other output bus connected to receive the first predetermined portion of the data word. Circuitry is provided for applying a second predetermined portion of the data word to control input of the multiplexer, whereby the multiplexer is caused to output either signals from the data memory or the first predetermined portion of the data word during time periods controlled by the second predetermined portion of the data word. A parallel to serial converter receives output signals of the multiplexer and converts the signals to serial form for application to a plurality of output lines.

Preferably a plurality of output tri-state gates each is connected in series with a corresponding output line. The tri-state gates are controlled by a third predetermined portion of the data word from the connection memory, whereby the transmission state of each of the output lines during any time interval can be controlled.

It is also preferred that a predetermined portion of the control signal is applied to a reserved control line for control of external circuits which may be connected thereto.

Figure 1A:
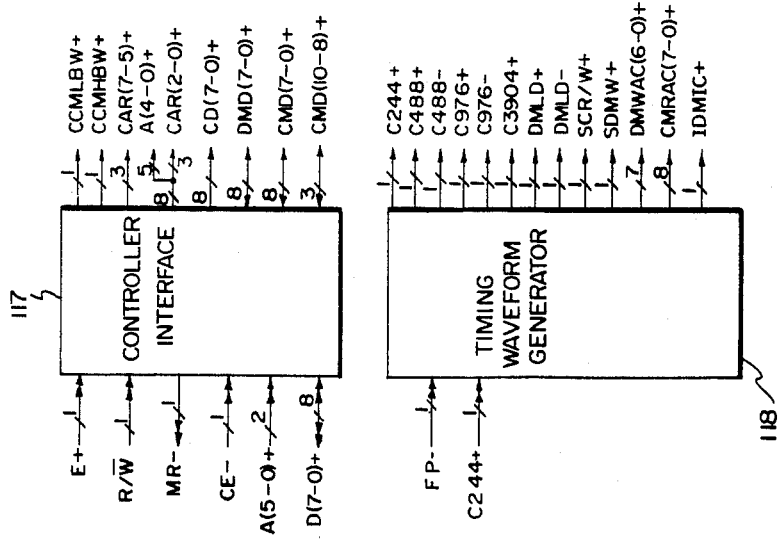
Figure 2B:
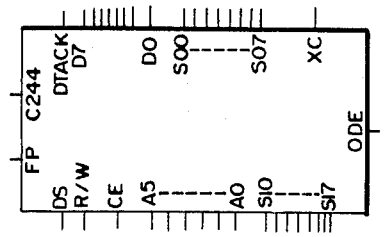
Figure 2A:
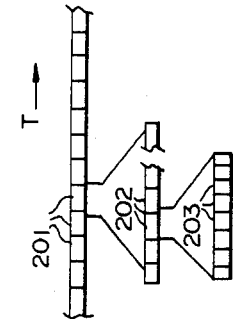
Figure 5C:
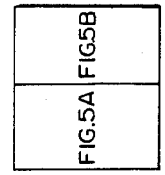
Figure 3:
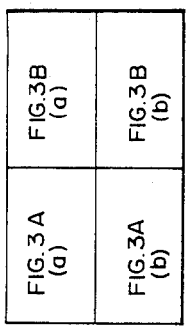
Figure 3A:
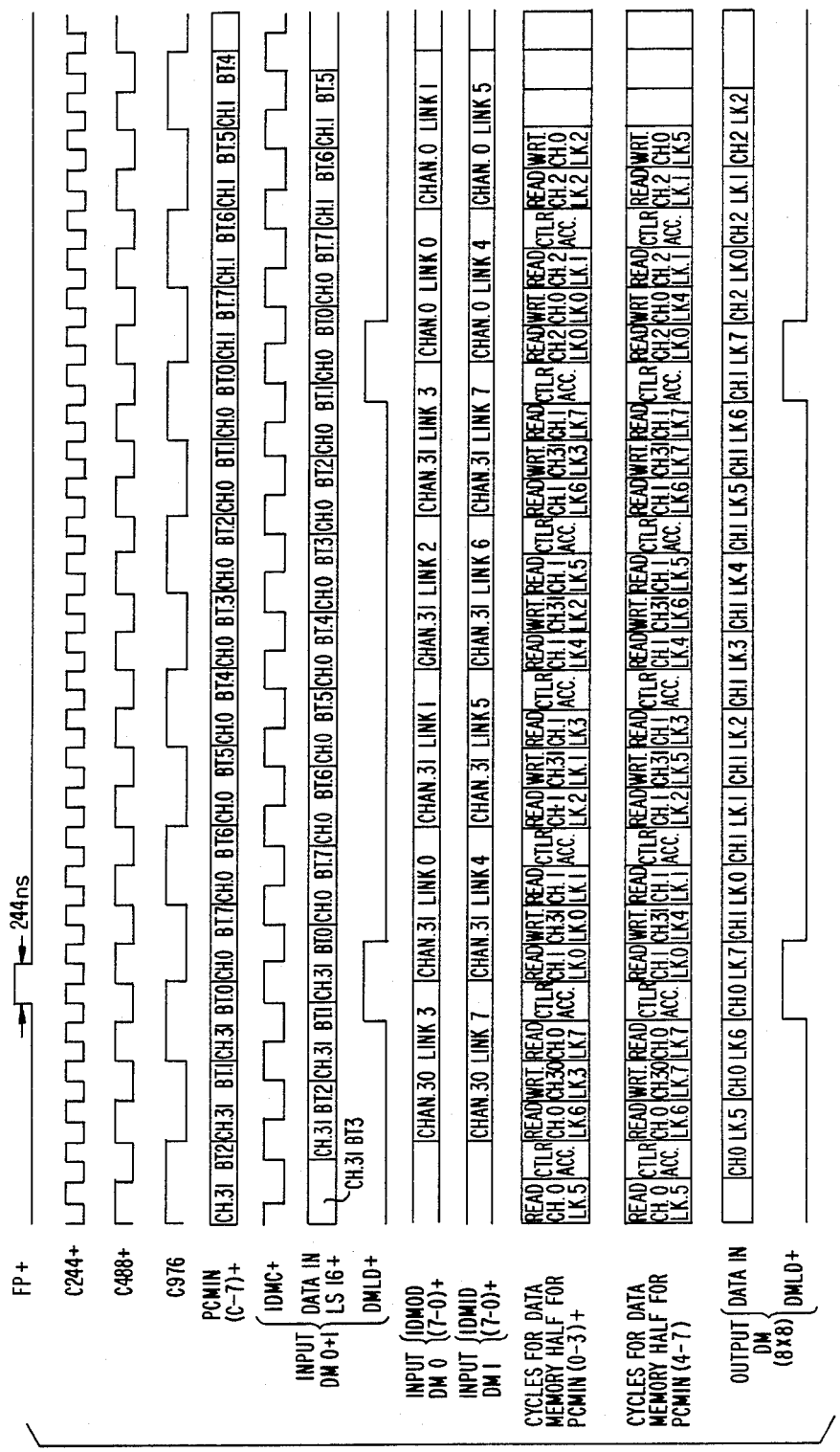
Figure 3A:
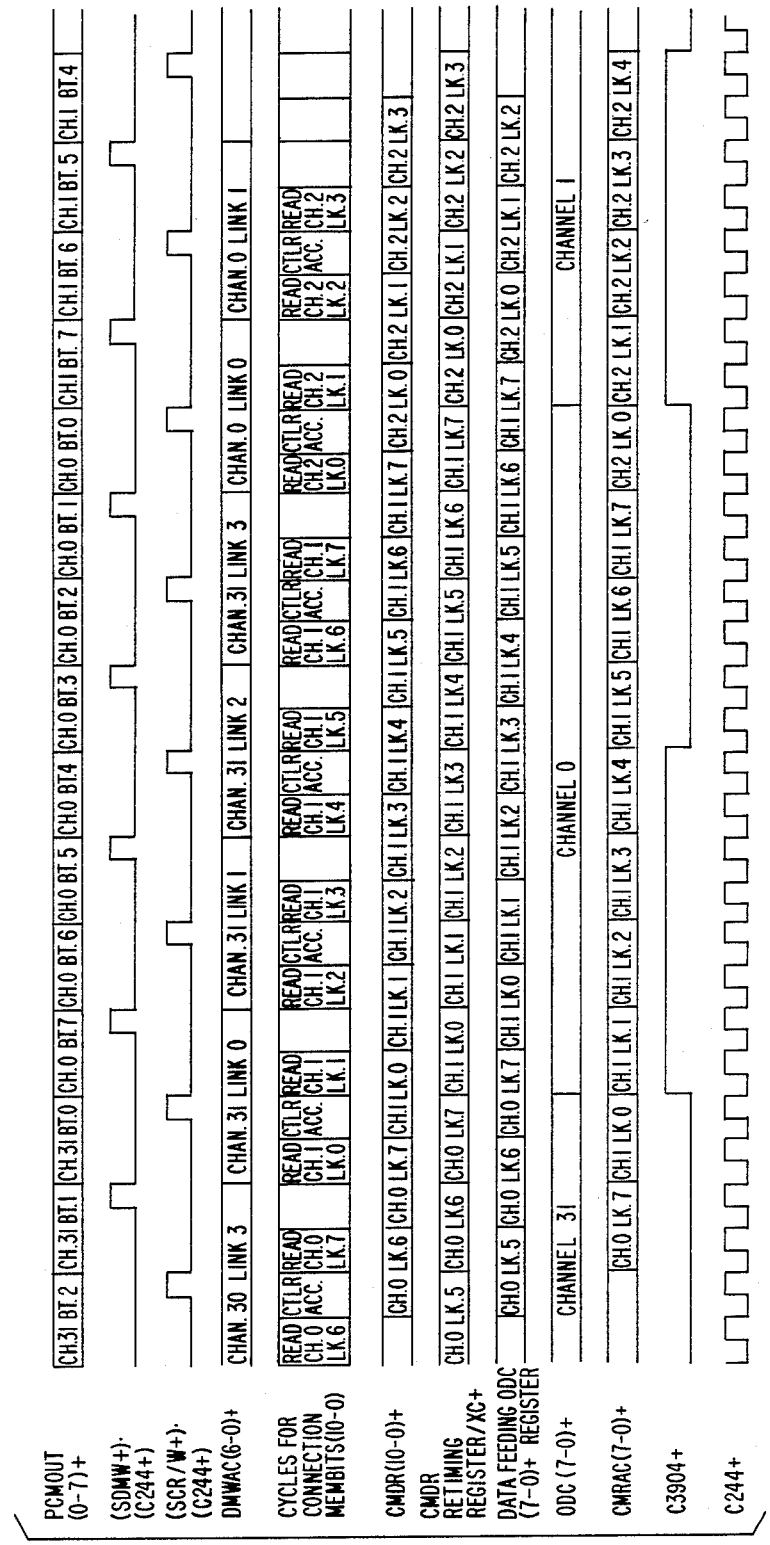
Figure 4:
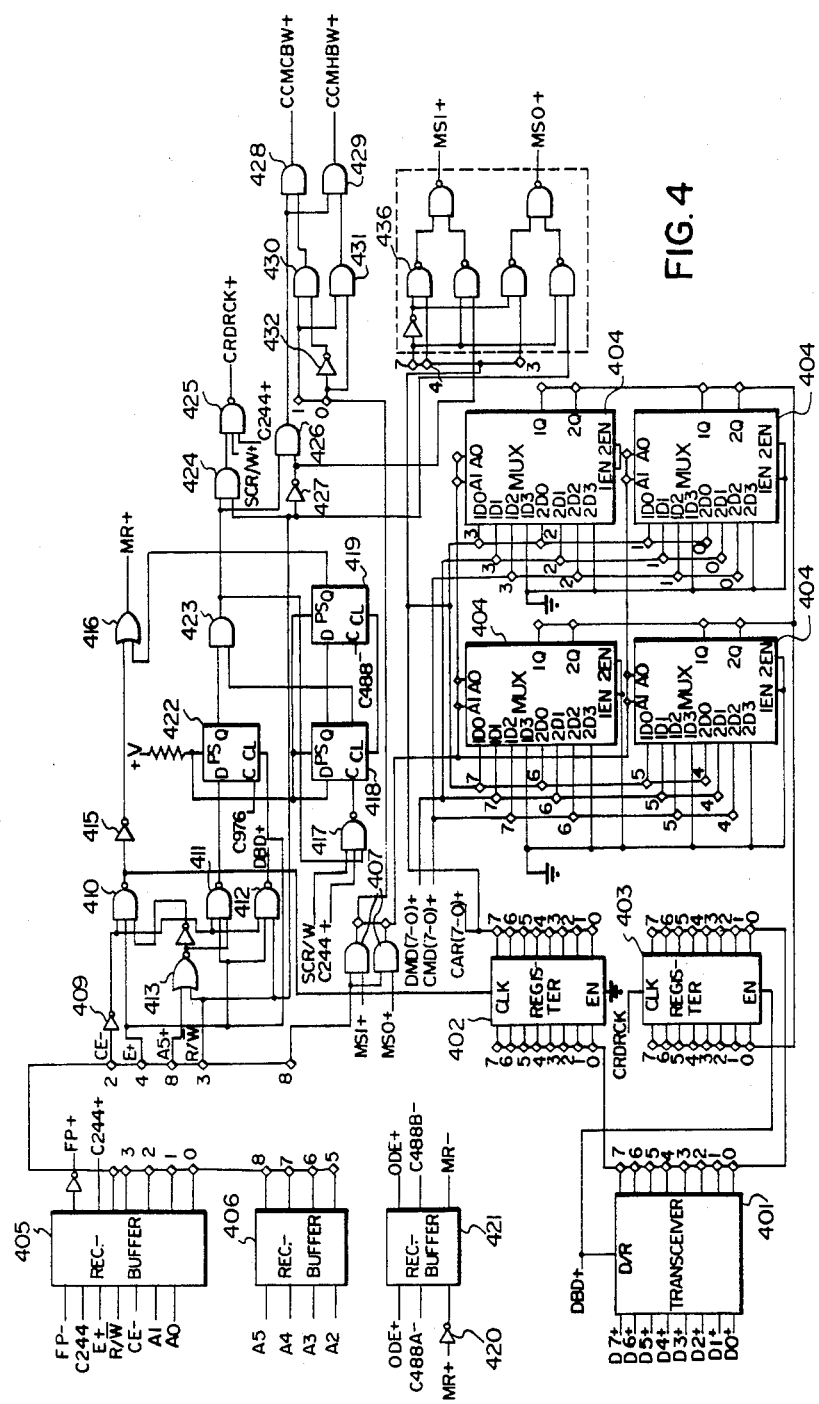
Figure 5A:
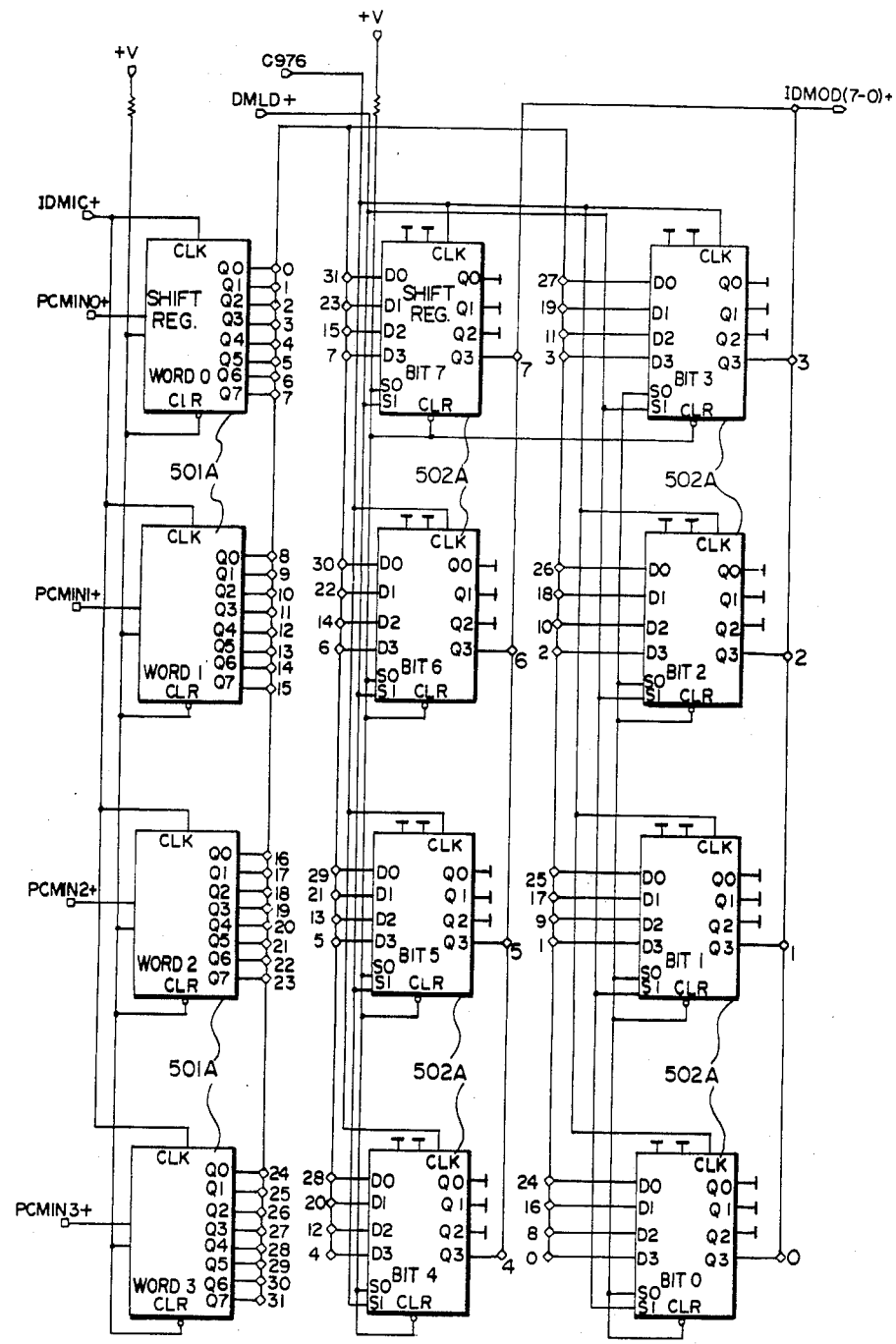
Figure 5B:
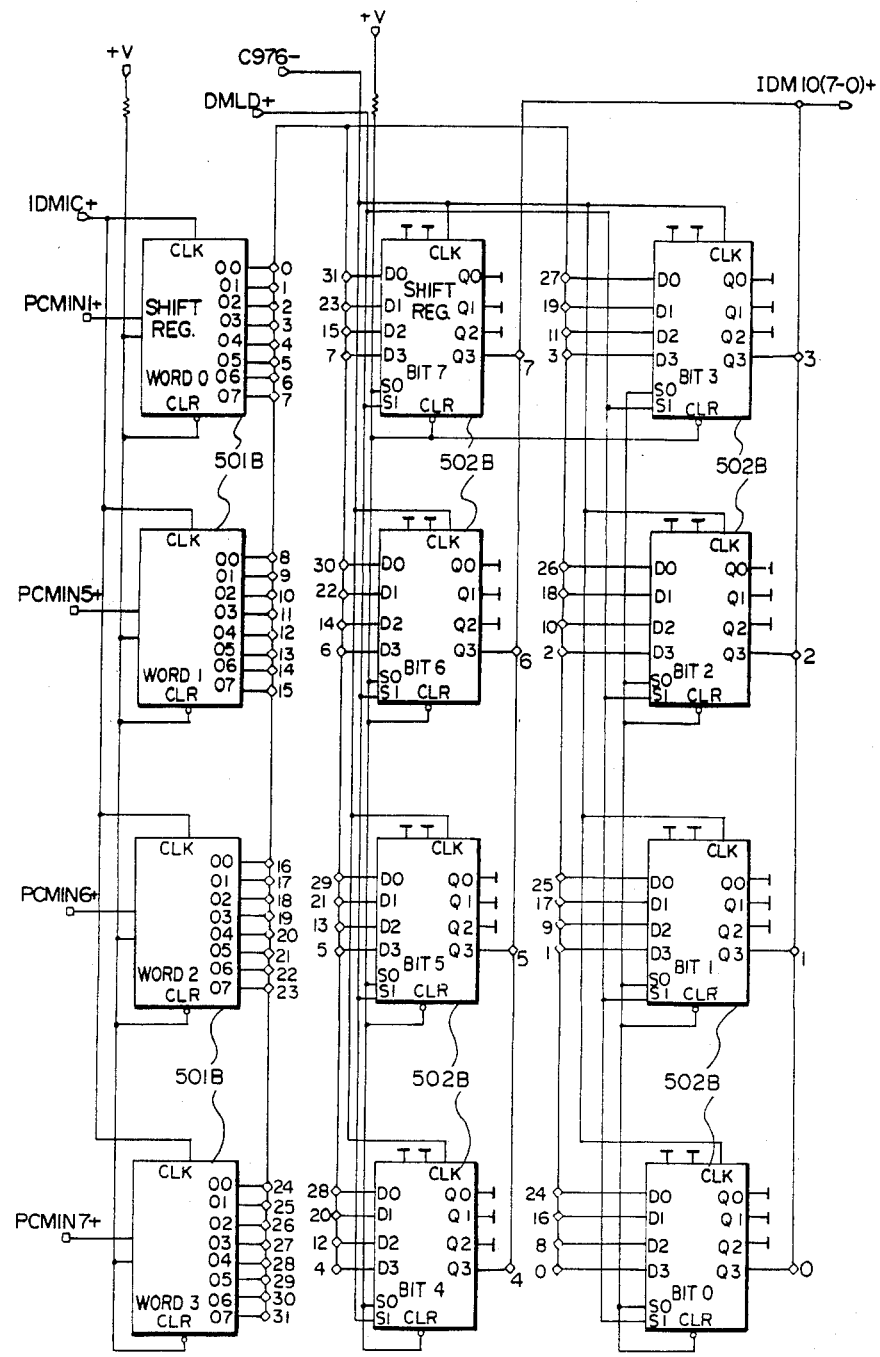
Figures 6A, 6C:
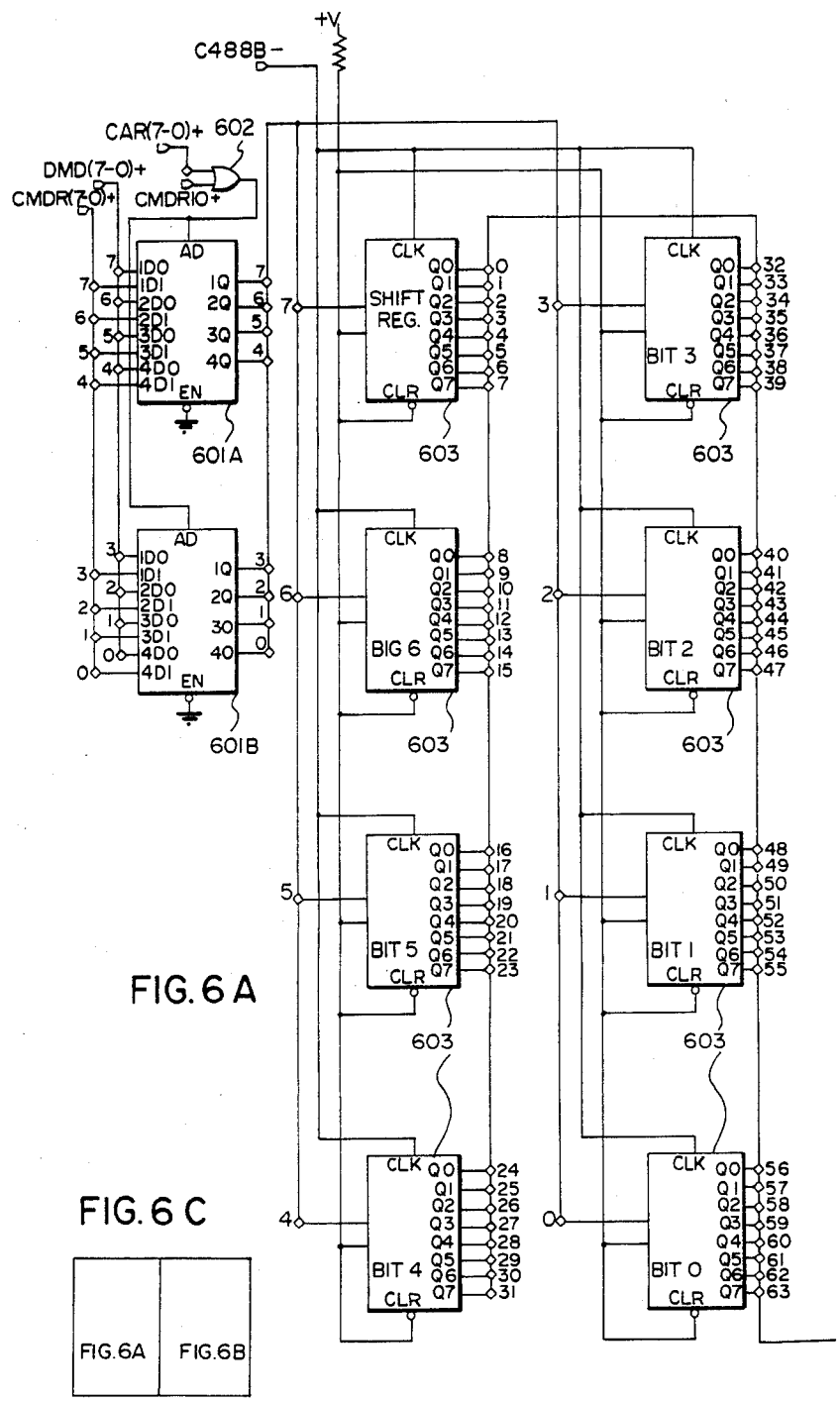
Figure 6B:
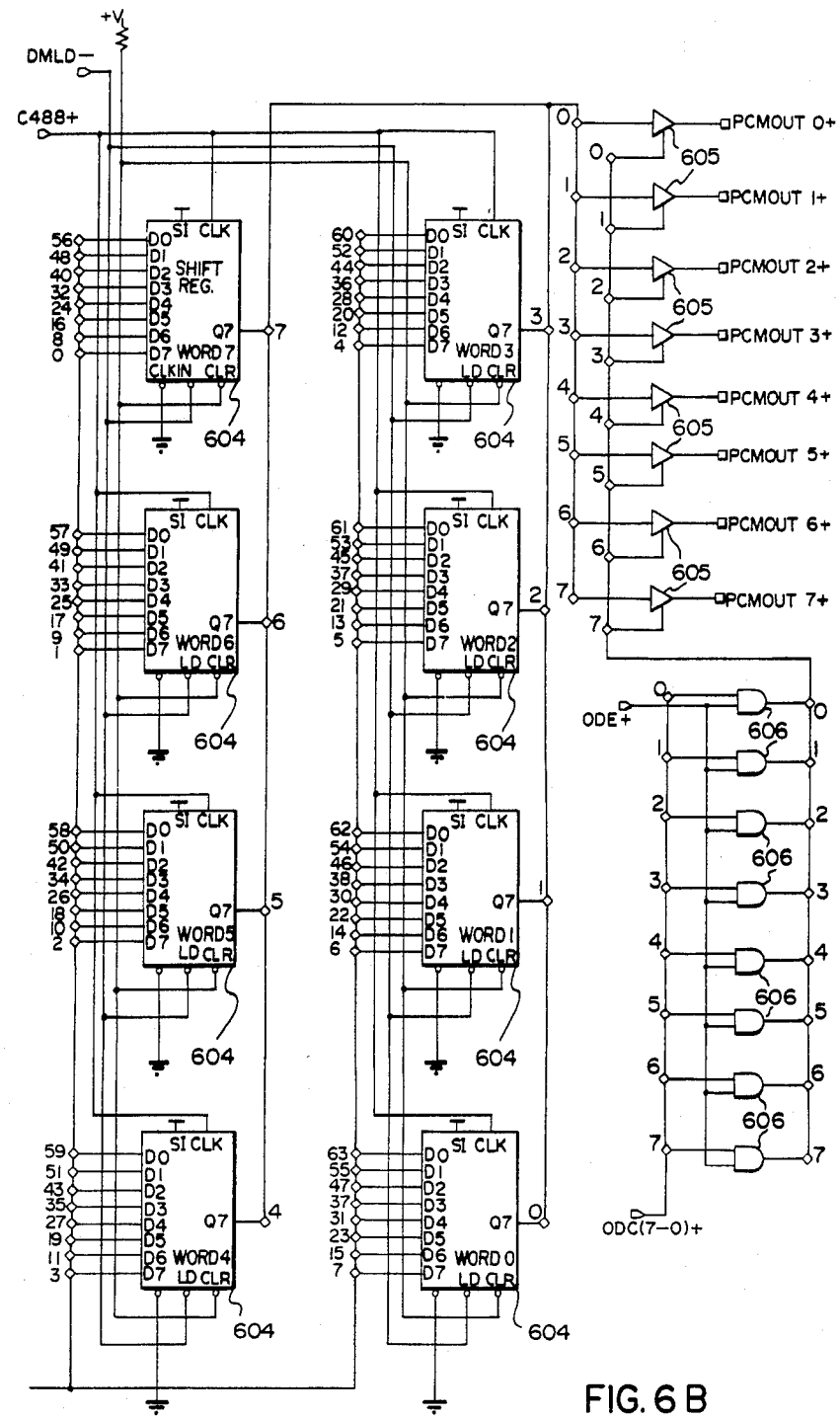
Figure 7:
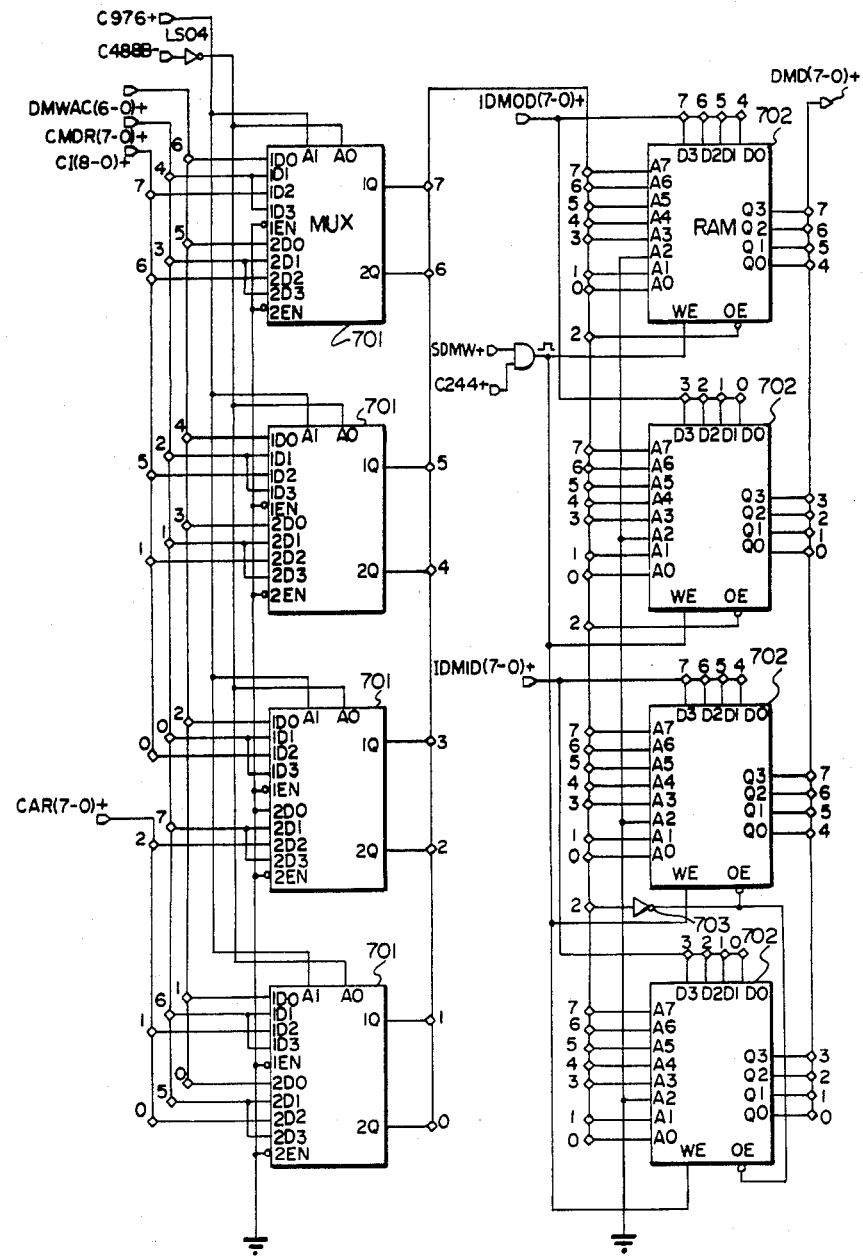
Figure 8B:
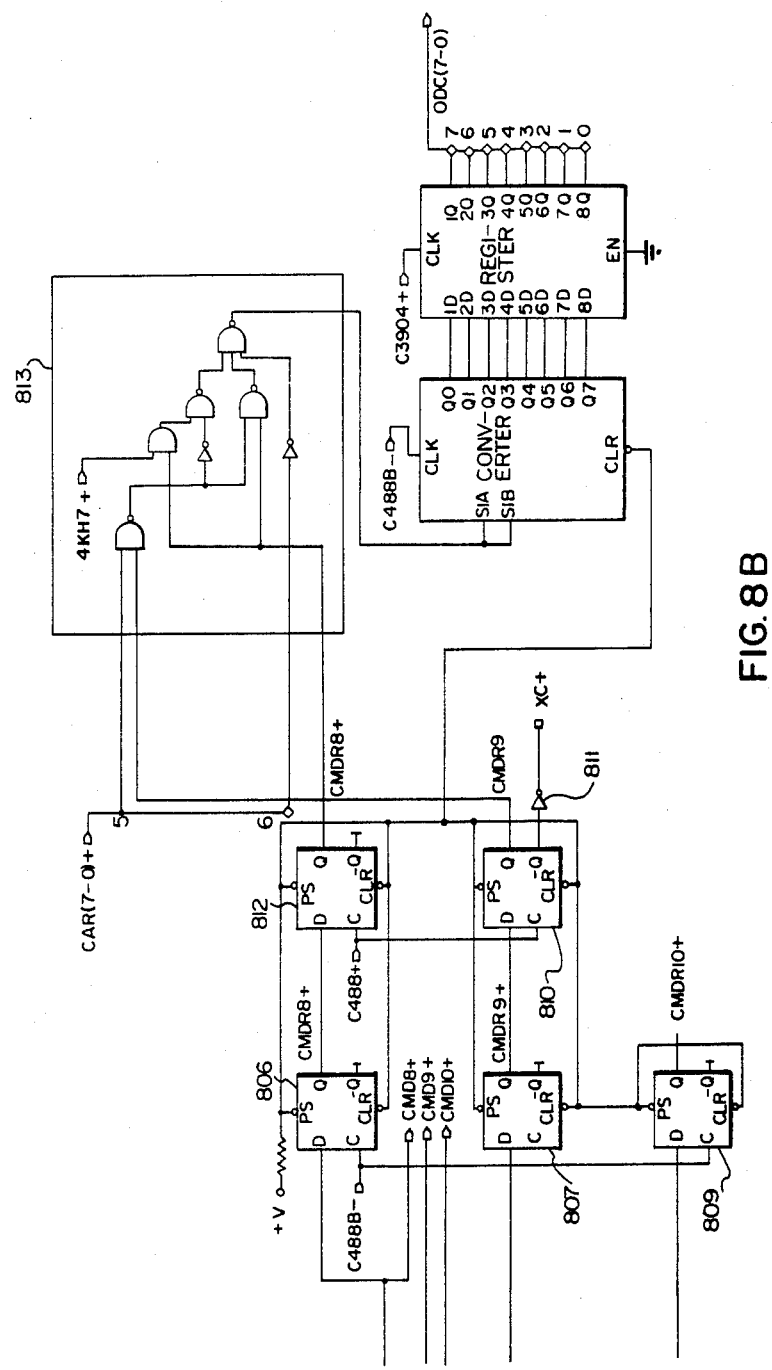

A better understanding of the invention will be obtained by reference to the detailed description below, and to the following drawings, in which:

FIGS. 1 and 1A form a block diagram of the invention,

FIG. 2A is a signal timing diagram,

FIG. 2B depicts a typical physical chip pin allocation where the present invention is integrated into a single chip, FIGS. 3, 3A($a$), 3A($b$), 3B($a$), and 3B($b$) form a timing waveform diagram, FIG. 4 is a logic diagram of the controller interface portion of the invention, FIGS. 5A and 5B are diagrams of the controller interface portion of the invention, FIGS. 6A, 6B and 6C are diagrams of the output data manipulator and ancillary circuitry portion of the invention, FIG. 7 is a diagram of the data memory and input multiplexer portion of the invention, and FIGS. 8A, 8B, and 8C are diagrams of the connection memory and ancillary circuitry portion of the invention.

Turning to FIG. 1, a plurality of input lines carrying time division multiplexed input signals, typically 8 lines in number referenced PCMIN0-PCMIN7 are connected to an input data manipulator, shown in two sections 101A and 101B. The data on each input line is received in serial format such as is shown in FIG. 2A, where the time T sequence of data is divided into frames 201, each frame being divided into 32 channels 202, and each channel being divided into 8 bits having a data word 203. In the manipulators 101A and 101B, the signals on each channel are converted from serial into parallel form. The resulting sequences of signals are applied via an 8 bit parallel link from each manipulator to the data D input of the two corresponding portions of a data memory 102A and 102B, referred to below as memory 102. This of course is also performed in the aforenoted U.S. Pat. No. 4,093,827. The timing of the storage of this data in data memory 102A and 102B is controlled by write control logic circuits 103A and 103B which itself are controlled by a pair of leads SDMW and CLK, source C244, both carrying timing waveforms generated in a timing waveform generator 118 (FIG. 1A). The memory portion could of course be combined, as could the input data manipulator portions and write control logic circuits. The data memory for the example shown is organized as 256×8 for storing one frame from each of the 8 input lines, each of which carries a 2.048 MHz serial data streams.

The output Q of data memory 102 is carried via an 8 bit parallel link through circuitry to be described later to an output data manipulator 104, which provides parallel to serial conversion. Manipulator 104 is operated by input, and output clock signals and output load timing signals on its I/PCLK, O/PCLK and O/PLD leads respectively.

8 bit parallel output leads 105 are connected to a corresponding number of tri-state switches or drivers 106, the outputs of which are connected to a group of 8 output leads PCMOUT0-PCMOUT7 each for carrying time division multiplexed output signals.

A 256×11 bit connection memory organized into an 8 bit portion 107A and a 3 bit portion 107B has its 8 bit parallel data input terminals D connected to a source of data, a controller interface 117 (FIG. 1A) which is connected to a microprocessor controller (not shown). The 8 parallel address inputs AD are connected to the output of a 2:1 multiplexer 108, which has two 8 bit parallel inputs. One of the inputs is divided into two groups, one for receiving addresses on 5 parallel lines A(4-0) and one for receiving addresses on 3 parallel lines CAR(2-0), for connection to a microprocessor controller via controller interface 117. The other 8 bit parallel input is connected to a timing waveform source on leads CMRAC(7-0). Write control logic circuits 109A and 109B have their outputs connected to the write leads W of the respective connection memory 107A and 107B, and have as inputs timing signals on leads CCMLBW, SCR/$\overline{\text{W}}$, and CLK244.

The 8 and 3 parallel output leads from outputs Q of connection memory portions 107A and 107B are connected to the data inputs of a pair of corresponding connection memory data registers 110A and 110B. The output leads of connection memory portions 107A and 107B are also connected to the CMD(7-0) and CMD(10-8) inputs of a controller interface which is connected to a microprocessor controller (to be described later).

The leads connected to the outputs Q of data memory 102 are connected to the DMD(7-0) inputs of the controller interface 117 which is connected to the microprocessor controller.

Output bits 0-7 of the connection memory data register 110A are applied to a corresponding 8 bit parallel inputs to multiplexers 110 and 111. The second 8 bit input of multiplexer 110 is connected to the output of data memory 102, and the 8 bit parallel output of multiplexer 110 is connected to the input of parallel to output data manipulator 104. Seven of the 8 parallel output bits of multiplexer 111 are applied to the address AD input of data memory 102, while the eighth bit is applied to the output enable input, the enable input of memory portion 102B through an inverter 119. An 8 bit parallel second input of multiplexer 111 is connected to the address A(4-0) output and the memory address output CAR(2-0) of controller interface 117. In addition, a third 7 bit parallel input is connected to timing waveform generator 118 on lead DMWAC(6-0).

Output bits 8-10 of the connection memory data register 110B are applied to a three bit parallel input CMDR10 of OR gate 112. A second input of OR gate 112 is connected to a CAR7 lead from the controller interface 117. The output of OR gate 112 is connected to the input selection part of multiplexer 110, whereby either of the two inputs to the multiplexer can be selected.

The output leads from the connection memory data register portion 110B carrying bits 8 and 9 are connected to the input of a retiming register 113, is passed through to logic circuit 120, and a single bit output lead is connected to the input of serial to parallel converter 114. The bit 9 output lead of retiming register 113 referenced XC is made available for control of an external circuit. Leads CAR6 and CAR5 from the controller interface 117 are connected to logic circuit 120.

Serial bits of the output lead from the connection memory data register 110 are converted in serial to parallel converter 114, and are applied in 8 bit parallel form from the output Q of converter 114 to an output driver control register 115. The output leads CDC(7-0) from register 115, which carry output driver control signals, are connected to corresponding inputs of an output enable control logic circuit 116, along with an output driver enable input lead ODE, which can be connected from external circuitry for forcing the output tri-state driver to a particular state from an external circuit. The output leads of output enable control logic 116 are connected to the control inputs of the output tri-state drivers 106.

A microprocessor controller interface circuit 117 interfaces the above described circuit to a microprocessor controller (not shown) via well known leads E, R/W, MR, CE, address bus leads A(5-0) and data bus leads D(7-0). The inputs to the controller interface 117 are the data memory read data leads DMD(7-0), of which there are 8, and the connection memory read data leads CMD(7-0) and CMD(10-8), a total of 11. The outputs from controller interface 117 are the single individual controller connection memory low and high write enable leads CCMLBW and CCMHBW, 5 address bit leads A(4-0) controller address register bits CAR(2-0), controller address register bits (7-5) specifying data and connection memory addresses, and 8 leads specifying connection memory input data CD(7-0).

In the prior art, input signals are received on leads PCMIN0-PCMIN7 and are converted from serial to parallel in a serial to parallel converter corresponding to input data manipulator portions 101A and 101B. The parallel data is then written into a speech memory corresponding to data memory 102. An address memory, corresponding to connection memory 107, stores addresses of data words to be read out to a parallel to serial converter corresponding to data manipulator 104, from where it is applied directly to the output lines PCMOUT0-PCMOUT7.

The present invention performs both a time switching and a space switching function as noted above.

However in the present invention, a microprocessor controller has both read access to the data memory 102 and read and write access to the connection memory 107. Consequently while the data memory 102 stores one frame of 8 bit words received on the 8 serial input links, any of this data can be read by the microprocessor controller. This is effected by the output of data memory 102 being connected via output leads DMD(7-0) from memory 102A to the input of controller interface 117. Thus data signals transmitted on the input PCM lines can be read by the microprocessor controller.

The microprocessor controller writes into the connection memory 107 via data leads CD(7-0) at addresses specified on leads A(4-0) and CAR(2-0) which are connected to multiplexer 108, and reads the contents of the connection memory via leads CMD(7-0) which are connected from the output of connector memory 107A to corresponding inputs of controller interface 117.

The microprocessor can also write directly to the output leads PCMOUT0-PCMOUT7 as follows. Signals from the connection memory are temporarily stored in data register portions 110A and 110B. The most significant 8 bits output from the connection memory data register 110A ((CMDR(7-0)) are applied to one of the parallel inputs of multiplexer 110, while the output bits of data memory 102 are applied to the other input. Since bit 10 from data register 110B with the bit on lead CAR7 from the microprocessor controller controls which of the two groups of inputs of multiplexer 110 are output therefrom to output data manipulator 104 and to the PCM output leads, it is clear that the microprocessor controller can substitute its own signals on the output leads instead of the PCM words from data memory 102.

As noted earlier, when such signals are stored in data memory 102 from a preceding matrix, either voice signals or data signals, these signals can be read via leads DMD(7-0) from the output of data memory 102 directly to the local microprocessor through the controller interface 117. Clearly controller to controller communication is facilitated using the present invention.

The signals stored in data memory 102 are normally designated to output PCM links and time slots by addresses specified by signals stored in the connection memory 107A, and which are input to multiplexer 111 via connection memory data register 110A and 8 bit parallel leads CMDR(7-0). In addition, the microprocessor can direct specific substitute words to be output from data memory 102 through memory address leads CAR(2-0) and A(4-0) which are input to multiplexer 111. A third source of signals to multiplexer 111 is timing signal lead DMWAC(6-0) which is connected from a timing waveform generator 118 (FIG. 1A).

The microprocessor writes 11 bit words (bits 0-10) into connection memory portions 107A and 107B at addresses specified on leads CAR(2-0) and A(4-0), at times specified by the write control logic circuits 109A and 109B, which issues write commands to the associated memory. Bit 10 of the connection memory is used to select either the data memory or bits 7-0 of the connection memory as the source of 8 bit words to be sent out on the serial output links. Depending on the state of bit 10, bits 7-0 either form the word to be transmitted via leads CMDR(7-0) and multiplexer 110 to the output data manipulator, or select one of the 256 8 bit words stored in the data memory to be transmitted on the corresponding output links during the corresponding channel time. As described earlier, bit 10 is passed through OR gate 112, which alters the state of multiplexer 110, defining the particular source of data which is enabled to pass therethrough to output data manipulator 104.

Bit 9 of the connection memory is used to control an external circuit. This bit is received from connection memory data register portion 110B, is corrected for phase in retiming register 113 with clock timing signal C488 and is made available on lead XC for control of external circuit.

Bit 8 passes from connection memory data register portion 110B through retiming register 113, through logic circuit 120 to serial to parallel converter 114, sequential bits being converted by serial to parallel converter 114 into 8 bit parallel form, which is stored in output driver control register 115. The output signal is applied to output enable control logic 116, from which it is applied to the gates of output tri-state drivers 106. The transmission and output impedance states of the tri-state drivers for corresponding output links are thereby specified.

When bit 10 is 0, bits 7-0 of the connection memory specify which one of the data memory words is to be sent out on the serial output link which corresponds to the connection memory location, during the channel time which corresponds to the connection memory location. Thus when bit 10 is 0, bits 7-0 are an address signal, which is applied from lead CMDR(7-0) through multiplexer 111 to the AD input of data memory 102.

When bit 10 is 1, bits 7-0 of the connection memory is the data word which is to be sent out on the serial output link which corresponds to the connection memory location, during the channel time which corresponds to the connection memory location. This word is passed through multiplexer 110 as described earlier.

The microprocessor controller thereby reads the serial input links from the data memory without concerning itself about frame, channel, and bit timing and serial to parallel conversion. By writing the connection memory, the microprocessor controller can transmit data words via the serial output links without concerning itself about timing and parallel-serial conversion.

Before proceeding further, it would be useful to review the physical and general operational aspect of the invention. As noted earlier, the structure is a combination voice and data time and space division crosspoint matrix. The structure in the preferred embodiment, and on a plurality of successful prototypes, was fabricated in a CMOS integrated circuit chip. The chip interfaces a clock, a microprocessor and input and output lines and a frame pulse source. The chip designations of the prototype, which correspond to those referred to in FIGS. 1 and 1A, are shown in FIG. 2B.

The signal applied to lead FP is the frame pulse for incoming signals. Lead C244 is a 244 nanosecond clock input. Leads S10-S17 are serial PCM inputs 0-7, and leads S00-S07 are serial PCM outputs 0-7. Lead ODE is an output driver enable input from an external source, which enables all of the output tri-state drivers together. Lead XC is an external control output. To interface a microprocessor controller, lead DS is for data strobe, R/W for read and write, DTACK is for data transfer acknowledge, CE is for chip enable, leads D7-D0 are the data lines, and leads A5-A0 are address lines.

The clock signal which is used by timing waveform generator 118 to generate all other timing and synchronization waveforms required is applied to lead C244.

To review the functions described earlier in summary with reference to the chip pins, the input pins S10-S17 are the eight input links to the chip. Serial digital signals clocked at 2.048 megabits per second enter each link and are stored in the data memory 102 in 32 byte blocks. Each frame pulse corresponds to the storage of 32 bytes for each of the eight incoming links. The serial data is converted to bytes, each byte corresponding to one channel time.

Leads S00-S07 are the eight output pins from the chip. The output is also an eight bit serial data stream, clocked at 2.048 megabits per second. The output is refreshed continuously every 125 microseconds, if the output drivers have been enabled. The source of this output data is specified by the controller microprocessor as either the data memory, from the input links, or from the connection memory, which is fed from a parallel bus.

Lead ODE is a hardware pin which enables or disables the output drivers. Its main purpose is to provide a means of avoiding contention between several crosspoint matrix chips whose outputs have been connected together. On power up, for example, the output drivers can be disabled, and the microprocessor controllers can write to an input/output latch to enable the outputs in a controlled way after they have been internally set up.

The external control lead XC is an output from bit 9 of the connection memory portion 107B. This bit is set up by the microprocessor controller which bit becomes active for any specified link or channel time. Its primary function is to externally enable individual crosspoint matrix chips which may be arranged in an array, and to provide for loop-around testing. Externally required circuitry is thus reduced to a minimum.

The DS, R/W, DTACK, and CE leads are hardware protocol pins which are used to interface the chip to a variety of microprocessors.

Leads D7-D0 are the parallel data lines to the chip, and are used to write control and data information into the chip. Leads A5-A0 are the six address lines to the chip, and are used for addressing and control information.

Thus the major elements on the chip are a data memory, constituted generally by 32 bytes of 8 bits per byte for each of 8 input lines (arranged as 8 pages), a connection memory arranged as 32 bytes of 11 bits per byte for each of 8 pages, and an address register (to be described with reference to the controller interface). The low and high byte of each page in the connection memory is retained for special forms of data.

A detailed description of the operation of the invention will be found below with reference to each of the circuit units referred to above. The specific form will be described with reference to popular and well known LS type integrated circuit chips. In order to understand the operation of the structural units of the invention, a description of the timing signals will be covered first.

The structural design of the timing waveform generator can take many easily designed forms, once the timing of the various waveforms is known. A description of the waveforms to be generated and resultant operation of the invention follows. Reference to FIGS. 1 and 1A will be useful.

First, with respect to the timing waveform generator 118 described with reference to FIG. 1A, an external master clock input C244+ provides clock pulses spaced 244 nanoseconds apart (the cycle time is 244 nanoseconds) to the waveform generator. In addition, a positive-going frame pulse having a pulse width of 244 nanoseconds is applied to the timing waveform generator at the beginning of every frame, the frame pulse being centered on the trailing edge of the position-going portion of the C244+ clock pulse, that is, centered on the clock cycle. The frame pulse is therefore one complete clock cycle in length, i.e. is of length of the duty cycle of 1 clock cycle.

Various clock signals are derived from the C244+ clock signal and the frame pulse, C244+, C488+, C448−, C976+, C976− and C3904+. These clock signals have a cycle time equal in nanoseconds to the numeral after the letter "C", and positive-going or opposite polarity as indicated by the + or −.

Figure 3B:
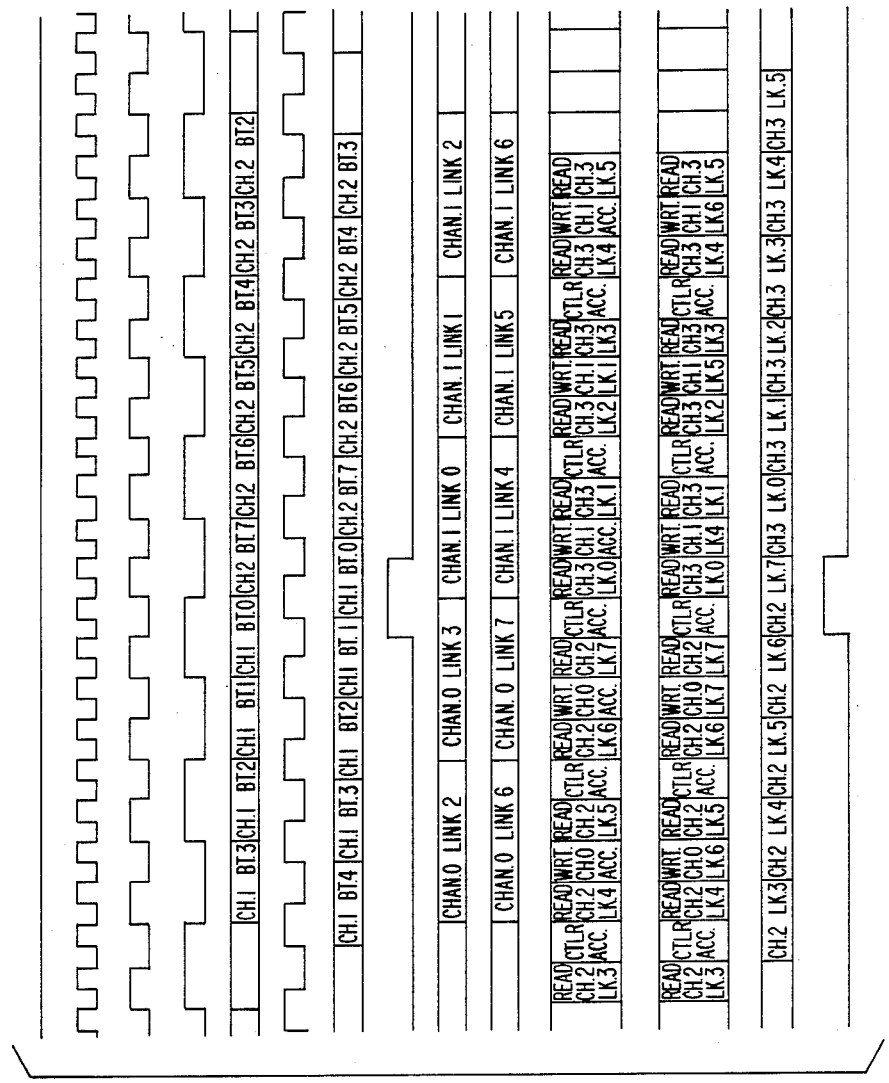
Figure 3B:
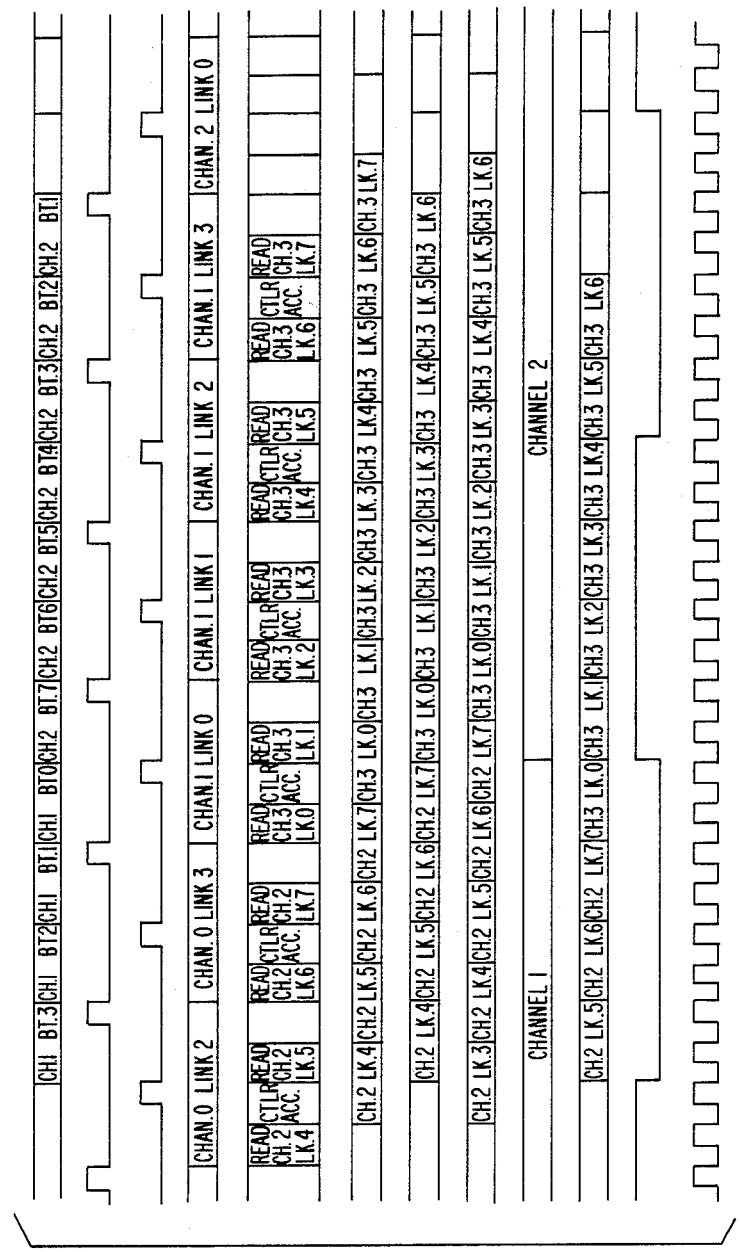

The remaining timing signals will be described by reference to the timing diagram in FIGS. 3A and 3B, placed together as a single continuous diagram.

Each of the waveform and timing sequences is labelled at the left-hand side of the figure as to its designation, time flows from left to right, i.e., the waveforms flow from right to left.

The top-most waveform is the externally received frame pulse FP+. The frame pulse is the system reference point, and as noted earlier, is 244 nanoseconds wide. The center of the frame pulse forms the frame boundary. The pulse of course appears at the boundary of each complete frame, and is generated from an external source which does not form part of this invention.

The waveform next below the frame pulse waveform is the externally received C244+ clock signal. This signal has a cycle time of 244 nanoseconds and a duty cycle of 50%. The trailing edge of the positive-going portion of the clock pulse is centered at the midpoint of the frame pulse.

The next waveform is the derived C488+ clock pulse, having a cycle period of 488 nanoseconds. The rising edge of the clock pulse is coincident with the center of the frame pulse.

The next waveform is the C976+ clock pulse, having a 976 nanosecond period. The trailing edge of the positive-going portion of the clock pulse is coincident with the center of the frame pulse.

Each of the clock pulses should have a duty cycle of 50%.

The next waveform PCMIN(0-7)+ shows the timing of each bit on a particular PCM input line to the input data manipulator portions 101A and 101B. Each of the time periods in this waveform contains one bit, and extends for 488 nanoseconds, in time with each half cycle of the C976+ clock signal. As an example, the 4th through 11th time periods carry the 7th through 0 bits of channel 0; the following eight time periods carry bits 7 through 0 of channel 1, etc.

The next timing sequence shows the signal on the IDMIC+ lead, which is applied to the input data manipulator portions 101A and 101B. This signal has a 488 nanosecond cycle period, with a 50% duty cycle. The rising edges of this signal should be timed at ¾ of the bit period after the beginning of each bit of the PCMIN(-0-7)+ signal, which causes a sampling of the bit at ¾ of a pulse after its start.

The next timing sequence shows the data timing after sampling, shifted by ¾ of a bit. The beginning of each bit begins coincident with the leading edge of each of the pulses in the IDMIC+ signal. The data and timing thus depicts the timing of the data as it is shifted into an input 8 bit shift register portion of the input data manipulator (to be described later) from the PCMIN lines.

Once a complete channel has been sampled and the signal stored in the first stage input 8 bit shift register, it is shifted into a second stage of the input data manipulator to make room for the bits of the second channel. The signal which clocks this procedure is provided on the DMLD lead, the DMLD signal being a 488 nanosecond pulse centered on the frame pulse center, appearing once every 8 bits during the 0 (or least significant) bit time.

The data in the input data manipulator, stored in parallel, is now transferred into the data memory, 8 parallel bits at a time. The data manipulator and data memory are each split into two as noted earlier to facilitate faster data transfer. Consequently the data from two inputs at a time are transferred into the data memory. The timing is shown in the two timing diagrams labelled Input DM0 and Input DM1, the signals appearing on the IDM0D (7–0)+ and IDM1D (7–0)+ leads. Each time demarcation indicates the interval during which the data for a particular indicated channel and link is available for recording in the data memory.

When the second DMLD+ pulse to the right is high, all of the data from channel 0 for all of the input links 0–7 will have been passed into the input data manipulator and converted to parallel. Four bidirectional shift registers for each of the two sections of the input data manipulator (to be described later) provides its output in sequence. For example, first the channel 0, link 0 and channel 0, and link 4 data is available during the 976 nanosecond period, followed by the channel 0, link 1 and channel 0, link 5 data, followed by the channel 0, link 2 and channel 0, link 6 data, followed by the channel 0, link 3 and channel 0, link 7 data. At this point the center of a DMLD pulse appears, indicating that the channel 1 data is about to be made available. Following this the channel 1, link 0 and channel 1, link 4 data becomes available, followed by the channel 1, link 1 and channel 1, link 5 data, etc. This sequence continues through to the channel 31, link 3 and channel 31, link 7 data, followed by the channel 0, link 0 and channel 0, link 4 data, etc.

The next two timing sequences indicate the cycles for the data memory, the first being for the half of the data memory dealing with data related to PCMIN(0–3) links and the second dealing with data related to PCMIN(-4–7) links. Each of the time intervals corresponding to the input DM0 and input DM1 periods is divided into 4 sequential periods, the first and third for reading, the second for writing and the last for controller access. Since two bytes are written into the two memory halves, two bytes out are read, only one memory portion being accessed at a time. Therefore there are four time slots with 8 write and 8 read cycles repeated 32 times per frame.

Considering the write cycle, the upper timing diagram designates writing channel 0, link 0 during the availability time of that channel and link in the input DM0 timing diagram. The lower timing diagram shows a writing cycle of channel 0, link 4 during the time that data from this source is available. Each write cycle is thus located in the second quarter time division under the data input period of the input DM0 and the input DM1 time.

Again coincident with the center of the DMLD pulse, the read cycle for a sequence of links occurs. As noted earlier, there are two read cycles during each channel and link availability period. For example, during the interval between two DMLD pulses, links 0–7 of channel 2 are read from each half of the data memory. This is followed by links 0–7 of channel 3, and so on.

The fourth cycle provides timing for the controller to have access to the data memory, during which data can be written, for the purposes described earlier.

The next timing sequence, labelled DATA IN indicates the timing by which the data from the data memory is strobed into the output data manipulator. The data is strobed into the output data manipulator shifted by one read cycle. Thus for example, the data read relating to channel 2, link 0 is strobed into the input stage of the output data manipulator during 2 cycles; the sequence is shown for channel 2, first link 0, then link 1, link 2, etc. through link 7, followed by channel 3, link 0–7, etc. This data is transferred to the second stage of the output data manipulator with the timing of the DMLD pulse, which is reproduced for convenience under the DATA IN waveform of the Output DM timing diagrams.

The PCM output timing diagram is next shown, labelled PCMOUT. Since all of the channel 2 data must be in the first section of the output data manipulator before it is transferred to the second section (see FIG. 5), the output link bytes begin at the center of the DMLD pulse similar to that of the input timing. Consequently the channel 2 data begins at the center of the third DMLD pulse, the highest significant bit being transmitted first. It should be noted that the memory elements which are read are chosen such that the output channel data timing matches the input channel data timing (compare timing diagram PCMOUT(0–7)+ to PCMIN(0–7)+. However the specific data which is included during the timing interval is that selected by the address stored in the connection memory, as described earlier.

The following two timing diagrams (SDMW+)(C244+) and (SCR/W+)(C244+) are the timing clocks for the data memory cycling counter (write data memory) and connection memory cycling counter (read connection memory) respectively. Writing occurs on the leading edge and reading occurs on the trailing edge of the respective pulses. The leading edges of these pulses are in synchronism with the leading edges of the IDMIC pulses.

The timing for the data memory write access counter input bits 6–0 is shown on the DMWAC(6–0)+ timing diagram. The time interval for channel 0, link 0 is centered on the second DMLD pulse, each time period being 976 nanoseconds long. Write access control for the link 0–3 of channel 0, followed by link 0–3 of channel 1, etc. to link 0–3 of channel 31 are sequenced.

The timing diagram for the connection memory follows, four cycles being contained within 976 nanoseconds. The first and third cycles are read cycles, the second cycle is reserved for controller access, and the last cycle is not used.

In the following sequence, the presentation of data from the connection memory data register CMDR(10–0) is illustrated. The connection memory data register 110A delays addressing of the data memory from the connection memory for two cycles. Each read cycle can be seen shifted by one cycle, and the interval is extended by one cycle (i.e., the data memory address) is read from the connection memory, held in the connection memory data register for 2 cycles, the last half of the register cycle (the last reading cycle) matching the reading time of the corresponding address in the data memory. For correspondence, compare the last half cycle of the CMDR (10–0) timing with the reading cycles of the data memory.

Thus in one channel interval, there are four controller access cycles and eight reads, during which the data memory addresses are pulled out to effect the switching function by the circuitry involving the data memory.

It was noted earlier that bits 8–10 from the connection memory are used for control of output tri-state drivers, or devices connected to an XC lead. During channel time n, they are read into retiming register 113, during channel time n+1 they are converted to parallel in serial to parallel converter 114, and during channel time n+2 they are held and then are used to directly control the output enable control logic (except for the external control bit which is available directly from the output of the retiming register). The CMDR Retiming Register/XC+, DATA IN Feeding Output Driver Control ODC (7–0)+ register and ODC (7–0)+ timing diagrams illustrate these processes. The timing from CMDR (10–0) is delayed one cycle followed by delay of data in DATA IN Feeding ODC (7–0)+ register, and the ODC (7–0)+ timing of the output driver control register 115 output signal. The latter extends during the complete channel intervals, the channel 0 period extending during the PCMIN and PCMOUT channel 0, bits 7–0 interval, channel 1 during the following channel interval, etc.

The next timing diagram depicts the connection memory read address counter bits (7–0) timing, waveform CMRAC (7–0)+. The intervals and timing are in synchronism with the PCMIN and PCMOUT intervals, the leading edge of each being coincident with the leading edge of a corresponding read cycle for the connection memory.

While the final timing diagram is a repetition for convenience of the C244+ clock pulse. The second last waveform, clock C3904 has a period of 3,904 nanoseconds and a duty cycle of 50%. The leading edge of each positive-going pulse is coincident with the center of the frame pulse, and a complete cycle corresponds to a complete frame.

It is preferred that address decoding in the microprocessor interface should be as fast as possible, since it is this time which determines the maximum clock rate of the controlling microprocessor. In addition, the delay from the trailing edge of the C244+ clock to PCMOUT(0–7)+ should be as small as possible, since it is this time which determines the maximum distance between two communicating switching matrices of the kind described herein.

In summary, therefore, during a write cycle for channel X, link Y, the eight bit PCM word received during channel X on PCM input link Y (PCMINY+) is written into a location reserved for it in the data memory. The 256×8 data memory is split into two, 128×8 halves to reduce the required memory speed. One half of the data memory stores the words received from PCM input links 0–3 (PCMIN(0–3)+), and the other half stores the words received on PCM input links 4–7 (PCMIN(4–7)+). During a read cycle for channel X, link Y, the 8 bit PCM word to be transmitted during channel X on PCM output link Y (PCMOUTY+) is read from either half of the data memory, from a location specified by the connection memory.

Bit 10 of the connection memory selects either the data memory or bits (7–0) of the connection memory as the source for words to be transmitted on the PCM output links (PCMOUT(0–7)+). Connection memory bit 9 is available to control an external circuit. Bit 8 controls the tri-state drivers for the output PCM link, and bits (7-0) either form the word to be sent or specify one of 256 input PCM words in the data memory to be sent out on each PCM output link during each channel time. If desired, bit 9 can be brought out to an external pin XC as an external serial control stream.

Turning now to FIG. 4, the structure of the preferred form of the controller interface is shown. A transceiver 401 (which can be of LS245 type) is connected on one hand to data bus leads D0-D7 and on the other hand to the inputs 0-7 of address register 402 (which can be of LS374 type) and to the outputs 0-7 of a controller read data register 403 of similar type. The outputs CAR(-7-0)+ of the controller address register are divided as follows: bits 0-2 designate memory page select and test configuration selection. Bits 3 and 4 are memory select bits, and bits 5-7 are mode select.

Bit lines 0-2 are connected to the multiplexers 108 and 111 (FIG. 1), bit lines 5 and 6 are connected to the logic at the input of serial to parallel converter 114, bit line 7 is connected to the input of OR gate 112, and bit lines 0-7 are connected to the memories and data manipulators as will be described later.

Bit lines 7-0 of the data memory bus DMD(7-0) and bit lines 7-0 of the connection memory data bus CMD(7-0) are connected to the inputs of multiplexers 404 (which can be of LS253 type). This allows the multiplexers 404 to read the connection memory or the data memory upon appropriate addressing by the controller microprocessor.

Address inputs A0-A1 of the controller interface are connected to the corresponding inputs of a receiver-buffer 405, and address inputs A2-A5 are connected to the corresponding inputs of a receiver-buffer 406. The well-known CE— R/$\overline{W}$, leads from the controller microprocessor are also connected to the corresponding inputs of receiver-buffer 405, along with clock source C244+, the frame pulse source FP— and source E+. The receiver buffers can be of LS241 type.

Four of the outputs of receiver buffer 405 provide output bit lines 0-4 and four of the outputs from receiver buffer 406 provide bit lines 5-8, additional outputs being clock C244+ and frame pulse FP+. If necessary an inverter can be connected in the FP+ lead to insure its correct polarity.

The eighth bit line is connected to the inputs of AND gates 407, the outputs of which are two bit lines connected in parallel to the address inputs A0 and A1 of multiplexers 404. The second inputs of AND gates 407 are connected respectively to multiplexer select lines MS0+ and MS1+. These lines are connected to the outputs of a logic circuit 408 which causes either lead to be enabled by bits received on the CAR3, CAR4, and CAR7 bit lines which are output from address register 402, and a further input from bit line 3 from receiver-buffer 405 which designates reading or writing (R/$\overline{W}$). Logic circuit 408 will be described in more detail later.

A further logic circuit provides outputs on the memory ready (MR+), controller connection memory low byte write (CCMLBW+), controller connection memory high byte write (CCMHBW+) and CRDRCK+ leads. To provide the signal on the MR+ lead, the CE— bit line, bit 2 from receiver-buffer 405 is connected through inverter 409 to one input of each of NAND gates 410, 411 and 412. The A5+ and R/$\overline{W}$ bit line, respectively connected to the bit 3 line of receiver buffer 405 and the bit 8 line of receiver buffer 406 are connected to inputs of NOR gate 413, the output of which is connected to a second input of AND gate 411, the output of which through buffer 414 is connected to a second input of NAND gate 410, and the R/$\overline{W}$ lead being connected to the second input of NAND gate 412. The E+ lead connected to the bit 4 line from receiver buffer 405 is connected to all three gates 410, 411 and 412. The output of NAND gate 412 is labelled lead DBD, which is connected to the direction control (DIR) input of transceiver 401, which allows data transmission in one or the other direction depending on the logic level at that input.

The output of NAND gate 410 is connected through inverter 415 to one input of OR gate 416, the output of which is the memory ready lead MR+.

The sychronous controller read/write lead (SCR/W+) and C244+ lead are connected to two of the three inputs of NAND gate 417. The source of its third input will be described shortly. The output of NAND gate 417 is connected to the clock input of a positive edge triggered flip flop 418, its data input being tied to a positive supply source. The Q output of flip flop 418 is connected to the data input of a further flip flop 419, its clock input being connected to timing source C488A—. The Q output of flip flop 419 is connected to the second input of OR gate 416. The clear leads of flip flops 418 and 419 are connected to the E+ lead referred to earlier. The lead MR+ is connected through a buffer 420 to an input of receiver 421, such as type LS241, for transmission on lead MR— to the controller microprocessor. The clock input of controller address register 402 is connected to the output of NAND gate 410. The circuit described above detects that the microprocessor has initiated a read cycle, and holds the microprocessor up until a window is open, then provides a logic signal on the MR lead to the microprocessor via receiver buffer 421.

The clock pulse for the controller read data register is received on the CRDRCK+ lead. This is derived as follows. The output of AND gate 411 is connected to the data input of flip flop 422, which has its clock input connected to timing source C976+. Its clear input is connected to the E+ lead.

The Q output of flip flop 422 is connected to one input of AND gate 423, the second input of AND gate 423 being connected to the —Q output of flip flop 418. The output of AND gate 423 is connected to the third input of NAND gate 417 referred to earlier, as well as to one input of AND gate 424. The second input of AND gate 424 is connected to the R/$\overline{W}$ lead (bit line 3 from receiver-buffer 405). The output of AND gate 424 is connected to one input of NAND gate 425, the output of which is the CRDRCK+ lead, connected to the clock input of controller read data register 403. A second input of NAND gate 425 is connected to timing clock source C244+, and a third input is connected to SCR/W lead referred to earlier.

The controller connection low byte write and high byte write (CCMLBW+ and CCMHBW+) signals are derived as follows. The output of AND gate 423 is connected to one input of AND gate 426, the other input of AND gate 426 being connected to the R/$\overline{W}$ lead through inverter 427. The output of AND gate 426 is connected to one input of each of AND gates 428 and 429, the outputs of which are the CCMLBW+ and CCMHBW+ leads respectively.

The bit 1 line output from AND gate 407 is connected to one input of both of AND gates 430 and 431, the respective outputs being connected to a corresponding second input of AND gates 428 and 429. The bit 0 line output of the second AND gate 407 is connected to one input of AND gate 431, and through inverter 432 to the second input of AND gate 430.

For the sake of completion of description, logic circuit 408 will now be described. The establishment of a descriptive truth table conforming to the logic described above is believed to be trivial to a person skilled in the art, and thus will not be reproduced in detail. The R/$\overline{W}$ lead is connected to one input of NAND gate 433 while a signal from the same lead, inverted through inverter 427 is applied to one input of NAND gate 434. One input of each of NAND gates 435 and 436 are connected respectively to the third and fourth bit CAR lines, which carry the memory select bits CAR3 and CAR4. The second inputs of NAND gates 433 and 434 are connected to the 7th bit line CAR7, which line is connected through inverter 437 to the second inputs of NAND gates 435 and 436.

The outputs of NAND gates 433 and 435 are connected to corresponding inputs of NAND gate 438, while the outputs of NAND gates 434 and 436 are connected to corresponding inputs of NAND gate 439. The outputs of the latter gates are the memory select leads MS0+ and MS1+, described earlier, connected to the inputs of AND gates 407.

The microprocessor controller applies a 5 bit code to leads D0–D7 (as well as three additional "mode select" bits, to be described later), the 5 bit code having three bits D0–D2 which selects one out of eight of the 32 byte pages in the data memory, the low byte page of the connection memory or the high byte page of the connection memory. The fourth and fifth bit D3 and D4 selects either the data memory, the connection memory low byte page or the connection memory high byte page. To select the data memory, bit D4 was a 0 and bit D3 was a 1, to select the connection memory low byte page bit D4 was a 1 and bit D3 was a 0, to select the connection memory high byte page, both bits D3 and D4 were 1's.

Once the address register 402 contains the data which designates which 32 byte memory page is to be accessed, in a particular memory, as well as three mode bits, the particular byte within the memory page which has been selected must be accessed. Address lines A0–A5 carry the byte selection address. When bit A5 is a 0, the data on leads D0–D7 are loaded into the address register. However when bit A5 is a 1, one out of the 32 bytes on the page is selected by the address register A0–A4.

When the data memory is selected, the connection memory specifies the output link and channel for the data memory output (which is used for PCM voice switching, for example). When the address selects the connection memory high byte, the data stored at the connection memory high byte location selects the serial output source, enables output drivers or writes external control signals for lead XC, FIG. 1. The address selected by bits A0–A4 selects the output by channel (i.e. 0–31). Bit D2 determines where the source of the serial output is to come from, i.e. when D2=0, it is to come from the data memory. The pointer to the location of the data is stored in the connection memory low byte, which selects the incoming page (link) and the byte (channel). When D2=1, the data comes directly from the connection memory low byte to the output byte channel.

The connection memory low byte location thus stores a word which is either a pointer to the data memory, or stores actual data to be transmitted out on a serial output link through a serial output driver.

Turning now to FIG. 5, the PCM input data manipulator (101A and 101B in FIG. 1) is shown. PCM input signals are applied on PCMIN0–PCMIN7 leads to 8 bit serial shift registers 501 (which can be type LS164). The clock inputs of shift registers 501 are connected to the IDMIC+ timing signal source, described earlier with respect to the waveform timing diagram FIGS. 3A and 3B, the 6th timing diagram from the top of the figure. The PCM input signals are thus shifted into each of the shift registers which correspond to the individual PCM input lines.

The outputs of shift registers 501A form a 32 bit bus, groups of four lines being connected to the four inputs of eight 4 bit shift registers 502A. Similarly, the outputs of 8 bit serial shift registers 501B form a 32 bit bus, groups of four bit lines being connected to the inputs of eight 4 bit shift registers 502B. The four bit lines of one 4 bit shift register are connected to the 0th, 8th, 16th, and 24th parallel bit lines, the inputs of the second 4 bit shift register are connected to the 1st, 9th, 17th and 25th, 32 bit bus, etc. the eighth 4 bit shift register being connected to the 7th, 15th, 23rd and 31st bit lines of the 32 bit parallel bus connected to the output of shift register 501A. The data inputs of 4 bit shift registers 502B are similarly connected to the 32 bit parallel output bus of shift register 501B.

The shift inputs S1 of shift registers 502A and 502B connected to the DMLD timing waveform signal source described with reference to the timing diagram FIGS. 3A and 3B (the eighth waveform from the top of the Figure). The second shift inputs S0 of shift register 502A are connected to a positive supply source along with the clear inputs of shift registers in this figure. The clock inputs of shift registers 502A and 502B are connected to clock source timing signal C976−.

The Q3 outputs of shift registers 502A are connected to individual bit lines of an 8 bit parallel bus carrying the input data manipulator data bits from one half of the input data manipulator, IDM0D(7–0)+ bus (reference 101A in FIG. 1). Similarly, the Q3 outputs of shift register 502B are connected to the 8 bit lines carrying the other half of the input manipulator data bits on the IDM1D(7–0)+ bus (reference 101B in FIG. 2). As described with reference to FIG. 1, these two buses are connected to 8 bit parallel data inputs to the two halves of the data memory 102.

The serial shift registers 501A and 501B thus are able to receive the serial PCM data on individual serial lines, and output the data via the shift registers on individual 8 bit lines of a pair of 32 bit buses. These bits are read, most significant bit first, in parallel to the four bit shift registers, first the individual bits of the 8 bit output from one shift register (bit lines 31–24), followed by the 8th bit of the next input shift register (bit lines 23–16), followed by the 8th bit of the next shift register (bit lines 15–8), followed by the 8th bit of the first shift register (bit lines 7–0). These signals are shifted through the four bit shift registers and are placed on the IDM0D(7–0)+ and IDM1D(7–0)+ bus containing eight parallel bit lines from where they are applied to the data memory.

FIG. 6 illustrates the output data manipulator including the input multiplexer which passes signals either from the data memory or from the connection memory, and also the output tri-state drivers. The input multiplexer unit is comprised of a pair of multiplexers 601A and 601B. These multiplexers each can select four bits from one of two four bit lines on input terminals 1D0–4D0 and 1D1–4D1. The input terminals 1D0–4D0 of multiplexers 601A and 601B are connected to bit lines 7–4 and 3–0 respectively of the DMD(7–0) bus, which, from FIG. 1, it will be recalled is the data output of data memory 102. Similarly input terminals 1D1–4D1 of multiplexers 601A and 601B are connected to the 7–4 and 3–0 bit lines of the CMDR(7–0) bus, which it will be recalled is the data bus connected to the least significant 8 bit output bit lines of the connection memory data register.

The address inputs of multiplexers 601A and 601B are both connected to the output of OR gate 602, which has one input connected to bit line 6 of the CAR(7–0) bus which is connected to the output of the controller address register 402 (FIG. 4), and its second input connected to the CMDR10+ timing signal (see timing diagram).

The four outputs of multiplexers 601A and 601B are connected in an 8 bit line bus to eight, 8 bit shift registers 603, one input of each of the shift registers being connected to one of the bit lines of the last-noted eight bit bus. The clock input of each of shift register 603 is connected to timing waveform source C488B—.

Each shift register 603 has eight outputs, all together forming 64 outputs. These are connected via a 64 bit line bus to the inputs of 8 bit shift registers 604, each input of each shift register being connected to a different bit line of the 64 line bus. The format is as follows, inputs D7 of each of the shift registers 604 are connected respectively to bit lines 0, 1, 2, . . . 7; inputs D6 are connected to bit lines 8, 9, . . . 15, etc., inputs D0 being connected to bit lines 56, 57, . . . 63.

The LD (load) inputs of shift registers 604 are connected to the DMLD timing signal waveform source (see timing diagram).

The Q7 outputs of shift registers 604 are connected to individual bit lines of an 8 bit bus, which are connected to corresponding inputs of tri-state drivers 605. The outputs of tri-state drivers 605 form the PCM output lines PCMOUT0+ — PCMOUT7+. The enable inputs of each of the tri-state drivers are connected to corresponding outputs of AND gates 606, each gate having one input in common connected to the output driver enable (ODE+) lead, which is from the receiver buffer 421 in FIG. 4, while the individual second inputs of AND gates 606 are connected to corresponding bit lines of the output driver connect (ODC+) bus from the output driver control register 115 (FIG. 1).

Data signals from the data memory and from the connection memory data register are thus applied to the DMD(7–0) and CMDR(7–0) inputs of multiplexers 601A and 601B. Timed by the CMDR10+ timing waveform, data from either of the sources is selected by a signal on bit line 6 of the CAR(7–0) bus. This data is output on the 8 bit parallel bus which is applied to the individual inputs of shift registers 603. This data is then applied to the 64 bit line bus interfacing shift registers 603 and 604, the data being shifted into shift registers 604 at the clock rate of the C488+ timing waveform. The data is loaded onto the 8 bit output bus and applied to tri-state drivers 605 for application to the PCMOUT-0-PCMOUT7 lines through tri-state driver 605 which are enabled through AND gates 606. The particular tri-state drivers to be enabled are selected by the data word applied to the ODC(7–0) bus, each bit line of which is passed through AND gates 606. The enabling signal is passed through AND gates 606 in time with the signal on the ODE lead.

FIG. 7 illustrates the data memory and the input multiplexer thereto (reference 111 in FIG. 1).

The input circuitry is a multiplexer which can be fabricated of 4 LS253 type multiplexer circuits. The address A0, A1 inputs are connected to clock sources C976+ and C488B respectively. As described with reference to FIG. 1, one of the inputs to the multiplexer is the data memory write address counter bit lines 6–0 on bus DMWAC(6–0), (see timing diagram). Bit lines 6 and 5 are connected to inputs 1D0 and 2D0 of one multiplexer, bit lines 4 and 3 are connected to inputs 1D0 and 2D0 of a second multiplexer, bit line 2 is connected to input 1D0 of a third multiplexer, and bit lines 1 and 0 are connected to inputs 1D0 and 2D0 of the fourth multiplexer. Thus addressing the D0 inputs of the multiplexers cause the DMWAC timing waveform to be passed through.

The second input to the multiplexer is the output bus from the connection memory data register CMDR(7–0)+. Bit lines 4 and 3 are respectively connected to the 1D1 (and 1D3) and 2D1 (and 2D3) inputs of the first multiplexer, bit lines 2 and 1 are connected to the 1D1 (and 1D3) and 2D1 (and 2D3) inputs of the second multiplexer, bit lines 0 and 7 are connected to the 1D1 (and 1D3) and 2D1 (and 2D3) inputs of the third multiplexer, and bit lines 6 and 5 are respectively connected to the 1D1 (and 1D3) and 2D1 (and 2D3) inputs of the fourth multiplexer. Thus when the D1 and D3 inputs are addressed, the connection memory data from the connection memory data register is passed through the multiplexer.

Bit lines 0, 1 and 2 of the CAR(7–0) bus are also connected to the third and fourth multiplexers. As will be recalled, these bits are received directly from the controller microprocessor, and select the test configuration and memory page. Bit line 2 is connected to the 2D2 input of the third multiplexer and bit lines 1 and 0 are connected to the 1D2 and 2D2 inputs of the fourth multiplexer.

Bus CI(8–0) which is connected to the address outputs of receiver buffers 405 and 406 (FIG. 4) is connected to the first, second and third multiplexers. Bit lines 7 and 6 are connected to inputs 1D2 and 2D2 of the first multiplexer, bit lines 5 and 1 are connected to inputs 1D1 and 2D2 of the second multiplexer, and bit line 0 is connected to input 1D2 of the third multiplexer. Consequently when the D2 inputs of the multiplexers are enabled, the page and word data is passed through the multiplexers.

The two outputs of each of the four multiplexers are connected to individual bit lines of an eight bit bus, which is connected to 7 of the 8 address inputs of random access memories (RAM) 702 as well as the output enable input. Address inputs A0 and A1 are connected to the 0 and 1 bit lines of the 8 bit bus which is connected to multiplexers 701 and address inputs A3–A7 are connected to bit lines 3–7 of the 8 bit bus respectively. The A2 inputs of random access memory 702 are connected to ground. The output enable inputs of the first two RAM memories are connected to bit line 2 of the 8 bit bus, while the other output enable of the last two RAM memories are connected to bit line 2 of the 8 bit bus through an inverter 703. The write enable WE inputs of all four chips are connected to the output of AND gate 704, one input of which is connected to the C244+ clock source and the second input of which is connected to the SDMW+ timing signal source (see timing diagram). The data inputs D0-D3 of each of the first two RAM memories are connected to 8 bit bus IDM0D and the data inputs of the third and fourth RAM memories are connected to the 8 bit data bus IDMID(7-0), the input PCM data buses described with reference to FIG. 5.

Each of the RAM memories can be RAM chip types LS208. The eight chips form a 128×16 bit data memory. The first two chips forming a 128×8 half of the data memory (address bit 2=0) are reserved for the data received on line PCMIN(0-3)+, while the second two chips forming a 128×8 half of the data memory (address bit 2=1) are reserved for the data received on PCMIN(4-7)+ leads.

The four bit output terminals of each of the halves of the data memory are connected to an 8 bit bus DMD(7-0)+, which carries the data signals to the controller multiplexer 404 (see FIG. 4) for reading by the controller microprocessor, or to the PCM output data manipulator input to multiplexers 601A and 601B (see FIG. 6).

The connection memory and ancillary circuitry through to the output driver control register is illustrated in FIG. 8. A pair of two input by four bit multiplexer circuits 801 e.g. chip types LS257 have their 1D0-4D0 inputs connected to bit lines 7-0 respectively of the connection memory read address counter bus CMRAC(7-0) (see timing diagram). Inputs 1D1-4D1 of one multiplexer chip are connected with the 1D1 input of the other multiplexer chip to bit lines 7, 6, 5, 1 and 0 respectively of the CI(8-0) bus (see FIG. 4), for receiving word selection addresses. Inputs 2D1, 3D1 and 4D1 of the second multiplexer are connected to bit lines 2-0 of the CAR(7-0) bus for receiving memory page selection (and test configuration selection) data signals. When the D0 inputs of the multiplexer is selected, therefore, the cyclic read address counting bits are selected and transferred through the multiplexer, and when the D1 inputs are selected, the page and word data is selected.

The address inputs of the two multiplexer chips are connected to the C4888— clock timing source.

The 8 outputs of the multiplexer are connected via an 8 bit bus to the 8 inputs of each of random access memories 802. In a successful prototype of the invention, three four bit memories were used. The 8 output bit lines from transceiver 401 (FIG. 4) are connected directly to the data inputs of the connection memory as follows. The first memory chip has its D0-D3 inputs connected to bit lines 7-4, inputs D0-D3 of the second memory connected to bit lines 3-0, and inputs D0-D2 of the final memory are connected to bit lines 0-2 of the CD(7-0) bus connected to transceiver 401.

The write enable WE input of the first two memory chips are connected to the output of AND gate 803, one input of which is connected to the CCMLBW (controller connection memory low byte write) lead (see FIG. 4), another input being connected to the SCR/W+ lead (see timing diagram), and its third input being connected to the C244 clock source. The write enable WE input of the third memory chip is connected to the output of AND gate 804 which has two of its inputs connected respectively to the SCR/W+ and C244+ leads, and its third input connected to the CCMHBW (controller connection memory high byte write) lead (see FIG. 4).

The four bit outputs of each of the first two memory chips are connected to individual bit lines of an 8 bit bus, each bit line being connected to a corresponding input of an 8 bit register 805, which can be type LS374. The 8 bit lines of register 805 are designated the connection memory data register output bus CMDR(7-0), which is connected to the data memory (FIG. 7) and also to the multiplexer feeding the PCM output data manipulator (FIG. 6).

Thus either data directly from the controller microprocessor or page, word and memory address data is passed through multiplexer 801, to address memories 802. The specific data stored in the memory is passed directly from the microprocessor controller via leads CD7-0 and via transceiver 401 directly into memories 802. The addressed data is passed into register 805, and addresses either the data memory, or passes data directly via the multiplexer connected to the input of the data manipulator through the output data manipulator and the output tri-state drivers to the PCM output lines.

It was noted earlier that the three least significant bits from the connection memory are used for the output driver controls and to provide an off-chip external control. The latter has been found to be extremely useful in coupling time division switching matrices of the type described herein together. These three least significant bits are handled as follows.

The Q0-Q2 outputs of the third memory chip 802 are respectively connected to three flip flops 806, 807 and 809, which have their clock inputs connected together to the C488B— clock source. It should be noted that the Q0, Q1 and Q2 outputs are also connected to leads CMD8+, CMD9+, and CMD10+ leads, which are connected to the 2D3, 1D3 inputs of one multiplexer 404 and the 2D3 input of another multiplexer 404. In this manner the controller microprocessor can read directly the least three of significant bits of the data outputted from connection memory 802.

The Q output of flip flop 809 is connected to the CMDR10+ lead, which is connected to the input of OR gate 602 (FIG. 6). The Q output of flip flop 807 is connected to the data input of flip flop 810, the −Q output of which is connected through an inverter 811 to the XC+ output lead. This lead is taken to an off-chip control terminal for external control purposes.

The Q output of flip flop 806 is connected to the data input of flip flop 812. The clock inputs of all of the flip flops 806, 807, and 809 are connected to timing waveform source C488B—, and the clock inputs of flip flops 810 and 812 are taken to the C488B+ waveform source. The clear CLR and PS inputs of the 5 flip flops are connected to a positive supply source.

Bit lines 5 and 6 of the CAR(7-0) bus, and the Q outputs of flip flops 810 and 812 are connected to a logic circuit 812 which is designed to provide the following truth table. Many alternative designs can be utilized and therefore the description of a specific circuit is considered to a person skilled in the art. In the table the Q output of flip flop 812 is referred to as CMDR8+, and the Q output of flip flop 810 is referred to as CMDR9+. The output of logic circuit 813 is referred to as ODC+.

| CAR6+ | CAR5+ | CMDR9+ | CMDR8+ | 4KHZ+ | 0DC+ |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 1 |
| 0 | 0 | 0 | 1 | 1 | 1 |
| 0 | 0 | 1 | 0 | 0 | 0 |
| 0 | 0 | 1 | 0 | 1 | 0 |
| 0 | 0 | 1 | 1 | 0 | 1 |
| 0 | 0 | 1 | 1 | 1 | 1 |
| 0 | 1 | 0 | 0 | 0 | 0 |
| 0 | 1 | 0 | 0 | 1 | 0 |
| 0 | 1 | 0 | 1 | 0 | 1 |
| 0 | 1 | 0 | 1 | 1 | 1 |
| 0 | 1 | 1 | 0 | 0 | 0 |
| 0 | 1 | 1 | 0 | 1 | 0 |
| 0 | 1 | 1 | 1 | 0 | 0 |
| 0 | 1 | 1 | 1 | 1 | 1 |
| 1 | X | X | X | X | 1 |

The ODC+ output of logic circuit 813 is connected to serial to parallel converter 814, which can be type LS164. The parallel outputs of converter 814 are connected to corresponding inputs of register 815, which register also has a clock input from clock source C3904+. The eight bit lines forming bus ODC(7–0) are connected to individual inputs of AND gates 606 (FIG. 6).

The three least significant output bits from the third memory chip 802 are applied to flip flop 806, 807 and 809. These function as a data register for connection memory bits 10–8. The two bits which are output from flip flops 806 and 807 are applied to flip flops 812 and 810 which function as a retiming register. The −Q output of flip flop 810 provides the external control signal referred to above. The Q outputs from the two flip flops 812 and 810, with mode select bits 5 and 6 of the CAR(7–0) bus (FIG. 4) and a 4 kilohertz clock signal are combined to provide a serial output signal converted in register 815 to a parallel signal, for controlling the tri-state drivers 65.

The control of the matrix is performed as follows.

The address register in the controller interface (FIG. 4) is the means by which the connection memory high byte, connection memory low byte and the data memory are addressed. The address register is addressed with the address A5=0. The nature of the data then written to the address register selects the specific memory and page which will be accessed on the next read or write to the chip.

The next access is done with a A5=1. For example, if the chip enable CE is set up to correspond to a chip address of $D000, then a write to $D000 will access the address register, and a read to $D020 (with A5=1) will access one of the memory bytes.

In summary, output data is selected by the microprocessor from the connection memory or from the data memory. The connection memory specifies the output link and channel for data memory output, the latter being used, for example, for voice switching of PCM signals.

When the address register is written to, as noted earlier address lead A5=0. The data on leads D0–D7 are applied to the address register. As noted earlier, leads D0–D2 selects one of 8, 32 byte pages (in the selected memory). Data D3 and D4 select the data memory, the connection memory low byte, or the connection memory high byte on the next read or write operation (and can also place the chip in a test mode, if designated by 00). Data bits D5–D7 are mode bits.

Where bits D6 and D7 equal 0, these bits are inactive.

Where bit D7=1, this designates that all subsequent non-address register reads are from the data memory, and all subsequent non-address register writes are to the connection memory low byte.

Where bit D6=1, this forces the chip in to the data mode, i.e., the connection memory high byte data bit 2=1 for all time, and the connection memory low byte specifies the serial output source. It also forces all serial output drivers on for all time, and the connection memory high byte data 0=1 for all time.

Where data D5=0, the external control (XC) is output for the appropriate link and channel. The XC bit is the connection memory data bit 1. The XC output is independent of the state of the corresponding drivers.

Data bit D5=1 was unused.

Where data bits D4 and D3 equals 0,0 respectively, this is the test mode and is not used in normal operation. Where the data bits are 0,1 respectively, this designates that the data memory will be accessed on the next read operation. Where the bits are 1,0 the connection memory low byte is accessed on the next read or write operation, and if the data bits are 1,1, this designates that the connection memory high byte is accessed on the next read or write operation.

Data bits D0–D2 select one out of eight 32 byte pages in a selected memory.

In summary, the page (link) and type of memory is selected by the data written to the address register noted above. The byte (channel) is selected by the address bits A4–A0 which are addressed by the next data memory read command, when A5=1. Thus to read channel 5, link 6, the following commands would be implemented (it is assumed that the reader is fully conversant with microprocessor operation and coding). When the description of such operation is given below, it will be given in three columns, the first being mnemonic, the second being machine code, and the third being a descriptor. The designations are given for the instruction set of a 6809 microprocessor, which is available from MOTOROLA INC., as well as full information therefor.

| LDA | #$16 | Data Memory, link 6 |
|---|---|---|
| STA | $D000 | Write address register |
| LDS | $D025 | Read data memory, channel 5 (A5=1, A4 −A0 = 00101) |

The connection memory high byte is used to select the serial output source, to enable the output drivers, and to write the external control (XC) bit. The page (link) and type of memory is selected by the data written to the address register. The next write, if addressed to the connection memory high byte, should select the output byte (channel) 0–31, i.e., where address bit A5=1, address bits A0–A4 can select 32 output bytes (channels). At the same time data bits D3–D7 should carry 0's for read, and "don't cares" for write. The state of data bit D2 determines where the source of the serial output is to come from, i.e. D2=0 designates that the source of the serial output is to come from the data memory. The pointer to the data memory is located in the connection memory low byte. The upper three bits of the connection memory low byte select the incoming page (link) in the data memory and the lower 5 bits select the incoming byte (channel). Where data bit D2=1, the source of the serial output is to come directly from the connection memory low byte.

The above-described operation of the present invention is important since it facilitates controller to controller communication, which is expected to be of major significance in establishing distributed processing switching network for either combined or separate data and voice.

Data bit D1 is the external control (XC) bit which is output for the channel time selected by address bits A4–A0 in the connection memory high byte address and for the page (link) selected by the previous write to the address register.

Data bit D0 is the serial output link tri-state driver control bit. If D0=1, the driver is turned on for the channel time specified in address bits A4–A0 and for the output link specified in the previous write to the address register. The external control pin ODE overrides any attempts by the software to turn the drivers on if they are disabled physically.

The connection memory low byte represents either the pointer to the data memory, or the actual data to be transmitted out of the addressed serial output driver. Access to this byte is done by writing to the address register to select the connection memory low byte and physical output link. The next write to the connection memory low byte then selects the output channel (byte) in address bits A4–A0. The format of the data byte will depend on the intent to use it as data, or as a pointer to the data memory.

If the byte is used as a pointer, then it selects the input page (link) and byte (channel) by using data bits D7–D5 as the input page (link) designator and bits D4–D0 as the input byte (channel) indicator.

If the byte is intended as parallel data, then the data byte will be sent out on the selected link.

The following examples will facilitate an understanding of how the invention is controlled. The three columns noted for each example are, respectively, mnemonic, machine code and a descriptor. The instruction set is with respect to the 6809 type microprocessor. It is of course contemplated that other forms of microprocessors could be used, such as 6802 or 6800. The DX Chip referred to is this invention.

EXAMPLE 1

Read Byte From Data Memory

| LDX | #DXADR | Get DX Chip address |
|---|---|---|
| LDA | #LINK | Get physical link (page) |
| LDB | #CHANL | Get byte (channel time) |
| ORA | #$08 | Mode=000, Connection memory next read |
| STA | ,X | Write Address Register |
| ABX | | Put channel in A4–A0 |
| LDA | $20,X | Read data byte (A5=1) |

EXAMPLE 2

Write Byte to Connection Memory Low Byte

| LDX | #$D000 | DX chip address |
|---|---|---|
| LDA | #LINK | Get link number |
| ORA | #$10 | Select conn mem lo byte, mode=000 |
| STA | ,X | Write address register |
| LDB | #CHANL | Get byte number |
| ABX | | Output channel —> A4–A0 |
| LDB | DATA | Get data |
| STB | #$20,X | Write to connection memory low byte |
| ORA | #$18 | Select conn mem hi byte, mode=000 |
| LDX | #D000 | Load DX chip address |
| STA | ,X | Write address register |
| LDB | #CHANL | Get byte number |
| ABX | | Output channel —> A4–A0 |
| LDB | #5 | Conn mem = serial output source Output driver on |
| STB | #$20,X | Write conn mem high byte |

EXAMPLE 3

Read 32 Byte Message

Read 32 byte from page of data memory into RAM of controller

| LDA | #PAGE | Get page number |
|---|---|---|
| LDX | #DXADR | Get DX chip address |
| LDY | RAM | Get pointer to RAM |
| LEAY | 32,Y | Selec end of RAM |
| ORA | #$88 | Non-reg mode, data memory |
| STA | ,X | Write address register |
| LEAX | 64,X | Select last byte of message |
| LDB | #32 | Initialize channel counter |
| LDA | ,–X | Read data byte |
| STA | ,–Y | Store byte, update table pointer |
| DECB | | |
| BNE | RDMSG | Loop back if not done |

EXAMPLE 4

Voice Channel Routing

Connect incoming channel and link to outgoing channel and link

| LDX | #DXADR | Get DXADDR |
|---|---|---|
| LDA | #LKOUT | Get outgoing link |
| ORA | #$10 | Select conn mem lo byte Mode = 000 |
| STA | ,X | Write address register |
| LDA | #LKIN | Get incoming link |
| LSLA | | |
| LSLA | | |
| LSLA | | |
| LSLA | | |
| LSLA | | Incoming link → D7–D5 |
| ORA | INCHNL | Incoming channel → D4–D0 |
| LDB | OUTCH | Get outgoing channel |
| ABX | | Merge bits |
| STA | 32,X | |
| LDA | #LKOUT | Get outgoing link |
| ORA | #$18 | Conn mem hi byte, Mode = 000 |
| STA | ,X | Write address register |
| LDB | #1 | |
| STB | 32,X | Enable data mem output, driver on |

EXAMPLE 5

Looparound Fault Testing

Looparound testing can be performed by using the XC output to systematically enable drivers which loop the DX chip output back to another chip for integrity checking. For example, to enable the XC output continuously for link 5, XC must be set for each of the 32 channel times.

| LDX | #DXADR | Get DX chip address |
|---|---|---|
| LDA | #$18 | Mode=000, connection mem hi byte |
| ORA | #5 | Select link 5 |
| STA | ,X | Write address register |
| LDA | #2 | XC Bit |
| LDB | #32 | Initialize loop counter |
| LEAX | 32,X | Select conn mem hi byte |
| STA | ,X+ | Write conn mem hi byte, XC=1 |
| DECB | | Update loop counter |
| BNE | LOOP | Update all channels |

This invention can be used for various applications, such as a voice switch, a message switch, a controller/scanner, etc. Use as a voice switch will become obvious in view of the description above. However the ability to enable the output tri-state drivers allows the circuit to be arranged in a non-blocking network, greatly increasing the switching capabilities from prior art arrangements. The use of the external control (XC) allows looparound testing of any circuit chip in the network.

While in the voice switching application, the bytes are interpreted as signal levels, in the message switching application the data memory interprets the input bytes as parallel data. The controller microprocessor interprets the data memory as an input from another controller. Similarly, the connection memory is used as the source of parallel data destined for the other controller. Thus each controller has a dedicated chip for full duplex communication between another controller and the chip. The data memory from one processor can be connected to the connection memory of the other processor, and vice versa. Physically, since the output tristate drivers are off the chip, this means that the eight input and eight output lines constitute eight duplex channels.

With this set up, the controller microprocessors can communicate uncaring of any parallel/serial and serial/parallel conversion. Thus dedicated interprocessor communication can be implemented using a predetermined protocol.

When used as a message switch, the apparatus controls information between controllers, or transports low speed data between peripherals and controllers or between peripherals. When used as a circuit switch, PCM encoded voice or high speed data is routed between peripherals, or bulk data between peripherals and system controllers.

The circuit chip can also be used to control binary drive points by writing to its connection memory or to scan sense points by reading its data memory. In this case proper timing must be provided for the interface to control and scan points. However the state of trunk, line or other peripheral circuits can be directly monitored and/or controlled. Each bit in the data memory can correspond to a scan point on a device in each bit in the connection memory and correspond to a control point. This allows the manipulation of large amounts of peripheral control signals over relatively few serial links.

The present invention, while described with reference to popular bipolar type chips, may all be integrated into a single chip, preferably using CMOS technology. It is believed that once integrated into a single chip, the cost for this novel structure would be so low, that it could be used in various configurations utilizing distributed switching and control, so as to make possible novel network designs previously thought not possible. This is particular feasible with the present circuit which allows controller to controller communication mutliplexed with PCM switched data on the same lines, and not only allows such communication and passage of switched data, but also control of the other similar circuits by means of the external control lead.

A person skilled in the art understanding this invention may now conceive of other embodiments, changes in design, etc., using the principles of the invention. All are considered within the sphere and scope of the invention as defined in the claims appended hereto.

I claim:

1. A time division switching matrix comprising:
   (a) means for receiving input signals divided into serial time slots according to a first sequence over a plurality of input lines;
   (b) switching means for switching said signals to a plurality of output lines according to a second sequence,
   (c) means for receiving control signals of one or more of first, second and third forms separately from said input signals from one or a plurality of control lines,
   (d) means for controlling said switching means to estabilish said second sequence upon receipt of said control signals of a first form, and for controlling said switching means upon receipt of a second form of said control signals to output a third form of said received control signals to one or more of said plurality of output lines.

2. A switching matrix as defined in claim 1, further including a connection memory for receiving and storing said control signals, and including means for applying said third form of said control signals to said switching means upon receipt by the connection memory of predetermined second form control signals.

3. A switching matrix as defined in claim 2 in which said switching means includes a data memory for receiving and storing said first sequences of signals, and further including means for switching sequences of signals alternatively from said data memory or said third form of control signals from said connection memory to said output lines as defined by said second form of said control signals.

4. A switching matrix as defined in claim 2, in which said switching means includes a data memory for receiving and storing said first sequences of signals, and further incuding means for applying signals from the data memory to said output lines according to said second sequence under control of said first form of control signals stored in the connection memory upon receipt of said second form of control signals of a first type and for applying signals from the connection memory to said output lines upon receipt of said second form of control signals of a second type.

5. A switching matrix as defined in claim 4, in which said means for applying signals is comprised of a multiplexer having a first plural input for receiving signals from the data memory and a second plural input for receiving signals from the connection memory, and further including means for applying signals output from the connection memory to the multiplexer, and means for applying said control signals to the connection memory and for causing sequential reading of said connection memory.

6. A switching matrix as defined in claim 1, 3 or 5 in which each of the output lines includes a tri-state driver, control logic for controlling the tri-state drivers, and means for applying signals from the connection memory to the control logic to control the state of each of the tri-state drivers during predetrmined time intervals.

7. A switching matrix as defined in claim 3, 4 or 5, in which the means for receiving includes means for converting the first sequences of signals into a parallel form for storage in the data memory, and further including means for receiving the signals output from the data memory in parallel form, for converting them into serial form and for applying them to said output lines, a tri-state driver in series with each of the output lines, and means for controlling said drivers by signals output from the connection memory.

8. A switching matrix as defined in claim 1, 3 or 5, including a reserved control line, and means for applying a predetermined portion of said control signals to said reserved control line for the control of external circuits which may be connected thereto.

9. A time division switching matrix comprising:
   (a) serial to parallel converter means for receiving time division multiplexed signals from a plurality of input lines and for converting said signals into sequences in parallel form,
   (b) data memory means for receiving said parallel form signals and for storing them according to a predetermined plan,
   (c) means for receiving control signals from a plurality of control lines, said control signals being comprised of address and data bits,
   (d) a connection memory for storing said data bits at locations specified by the address bits,
   (e) means for sequentially reading the connection memory, to output a data word formed of a plurality of parallel bits,
   (f) multiplexer means having a pair of input buses, one input bus connected to receive output signals from the data memory, and the other input bus connected to receive a first predetermined portion of said data word,
   (g) means applying a second predetermined portion of the data word to a control input of the multiplexer means, whereby the multiplexer means is caused to output either signals from the data memory or said first predetermined portion of said data word during time periods controlled by the second predetermined portion of said data word,
   (h) parallel to serial converter means for receiving output signals of the multiplexer means and for converting said signals to serial form for application to a plurality of output lines.

10. A switching matrix as defined in claim 8 further including a plurality of tri-state gates, each connected in series with a corresponding output line, means for controlling the tri-state gates under control of a third predetermined portion of said data word from the connection memory, whereby the transmission state of each of the output lines during any time interval can be controlled.

11. A time division switching matrix comprising:
   (a) means for receiving time division multiplexed input signals from a plurality of input lines,
   (b) data memory means for storing said input signals according to a predetermined plan,
   (c) means for receiving control signals,
   (d) controlling means for causing output of signals from a data memory to a plurality of output lines according to a plan defined by said control signals and for causing output, according to a plan defined by said control signals, of predetermined portions of said control signals to one or more of said output lines.

12. A switching matrix as defined in claim 11, in which said controlling means includes means to cause output of said predetermined portions of said control signals in place of signals from said data memory, to said output lines.

13. A switching matrix as defined in claim 12, including a reserved output line, and means for applying a further predetermined portion of said control signal to said reserved output line.

* * * * *

UNITED STATES PATENT AND TRADEMARK OFFICE
CERTIFICATE OF CORRECTION

PATENT NO. : 4,510,597
DATED : April 9, 1985
INVENTOR(S) : Conrad Lewis

It is certified that error appears in the above-identified patent and that said Letters Patent is hereby corrected as shown below:

The front page of the patent should indicate the following:

--Foreign Application Priority Data

Sept. 11, 1981    Canada    385,726-- --.

Signed and Sealed this

Third Day of January, 1989

Attest:

DONALD J. QUIGG

Attesting Officer

Commissioner of Patents and Trademarks